United States Patent
Lin et al.

(10) Patent No.: US 8,362,751 B2
(45) Date of Patent: Jan. 29, 2013

(54) HARNESSING POWER THROUGH ELECTROMAGNETIC INDUCTION UTILIZING PRINTED COILS

(75) Inventors: Gloria Lin, San Ramon, CA (US); Pareet Rahul, Markham (CA); Michael Rosenblatt, Campbell, CA (US); Taido Nakajima, San Jose, CA (US); Bruno Germansderfer, Boston, MA (US); Saumitro Dasgupta, Boston, MA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/488,287

(22) Filed: Jun. 4, 2012

(65) Prior Publication Data

US 2012/0235510 A1 Sep. 20, 2012

Related U.S. Application Data

(63) Continuation of application No. 12/554,550, filed on Sep. 4, 2009, now Pat. No. 8,193,781.

(51) Int. Cl.
| | |
|---|---|
| *H02K 35/00* | (2006.01) |
| *H01F 5/00* | (2006.01) |
| *H02K 3/04* | (2006.01) |
| *H02K 17/00* | (2006.01) |
| *H02K 19/00* | (2006.01) |
| *H02K 21/00* | (2006.01) |
| *H02K 23/26* | (2006.01) |
| *H02K 27/02* | (2006.01) |

(52) U.S. Cl. ............... 322/3; 310/208; 336/200
(58) Field of Classification Search ............ 310/208; 322/3; 336/200
See application file for complete search history.

(56) References Cited

U.S. PATENT DOCUMENTS

| | | | |
|---|---|---|---|
| 2,014,524 A | 9/1935 | Franz | 336/200 |
| 2,874,360 A | 2/1959 | Eisler | 336/200 |
| 3,002,260 A | 10/1961 | Shortt et al. | 29/602.1 |
| 3,234,632 A | 2/1966 | Marley | 29/606 |
| 3,587,019 A | 6/1971 | Bull et al. | 336/200 |
| 3,719,845 A | 3/1973 | Takeda | 310/268 |
| 3,726,004 A | 4/1973 | Holland et al. | 29/602.1 |
| 3,736,543 A | 5/1973 | Lademann et al. | 336/200 |
| 4,246,446 A | 1/1981 | Yoshida et al. | 369/136 |
| 4,271,370 A | 6/1981 | DiMeo | 310/266 |
| 4,340,833 A | 7/1982 | Sudo et al. | 310/268 |

(Continued)

FOREIGN PATENT DOCUMENTS

WO 2008/137996 11/2008

OTHER PUBLICATIONS

Ching et al., "PCB Integrated Micro-Generator for Wireless Systems," The Chinese University of Hong Kong, http://www.cse.cuhk.edu.hk/-phwl/mtlpublic/archives/papers/gen_isssm00.pdf, accessed on Aug. 3, 2009.

(Continued)

*Primary Examiner* — Pedro J Cuevas
(74) *Attorney, Agent, or Firm* — Womble Carlyle Sandridge & Rice LLP

(57) ABSTRACT

Systems for harnessing power through electromagnetic induction utilizing printed coils are provided. A system can include one or more moveable magnets adjacent to printed coils on a circuit. For example, a system can include one or more magnets that are operative to move alongside a circuit board that includes printed coils. The one or more magnets may move, for example, when a user shakes the system or when the user walks or runs while holding the device. The movement of the one or more magnets may create an electromotive force (e.g., a voltage) across the printed coils, and this force may be used to generate electric power.

21 Claims, 17 Drawing Sheets

U.S. PATENT DOCUMENTS

| | | | | |
|---|---|---|---|---|
| 4,421,997 | A | 12/1983 | Forys | 310/12.04 |
| 4,494,100 | A | 1/1985 | Stengel et al. | 336/200 |
| 4,527,877 | A * | 7/1985 | Kurosu et al. | 396/463 |
| 4,639,708 | A | 1/1987 | Weatherly | 336/200 |
| 4,645,961 | A * | 2/1987 | Malsky | 310/156.07 |
| 4,651,254 | A | 3/1987 | Brede et al. | 361/248 |
| 4,916,345 | A | 4/1990 | Tong | 310/208 |
| 4,918,418 | A | 4/1990 | Tsala | 336/180 |
| 4,962,329 | A | 10/1990 | Fujita et al. | 310/208 |
| 4,982,157 | A | 1/1991 | Seifert | 324/248 |
| 5,012,571 | A | 5/1991 | Fujita et al. | 29/598 |
| 5,296,831 | A | 3/1994 | Suzuki | 336/200 |
| 5,420,558 | A * | 5/1995 | Ito et al. | 336/200 |
| 5,477,204 | A | 12/1995 | Li | 336/200 |
| 5,497,137 | A * | 3/1996 | Fujiki | 336/200 |
| 5,521,573 | A | 5/1996 | Inoh et al. | 336/180 |
| 5,572,179 | A * | 11/1996 | Ito et al. | 336/200 |
| 5,874,881 | A * | 2/1999 | Steinbusch | 335/222 |
| 6,000,128 | A | 12/1999 | Umeno et al. | 29/846 |
| 6,028,738 | A * | 2/2000 | Konno et al. | 360/99.08 |
| 6,144,281 | A * | 11/2000 | Lorris | 336/200 |
| 6,189,200 | B1 | 2/2001 | Takeuchi et al. | 29/602.1 |
| 6,236,297 | B1 | 5/2001 | Chou et al. | 336/200 |
| 6,281,779 | B1 | 8/2001 | Matsumoto et al. | 336/200 |
| 6,344,936 | B1 * | 2/2002 | Santo et al. | 359/824 |
| 6,345,434 | B1 | 2/2002 | Anbo et al. | 29/602.1 |
| 6,362,716 | B1 | 3/2002 | Anbo et al. | 336/200 |
| 6,380,836 | B2 | 4/2002 | Matsumoto et al. | 336/200 |
| 6,498,555 | B1 | 12/2002 | Sakata | 336/200 |
| 6,587,025 | B2 | 7/2003 | Smith et al. | 336/200 |
| 6,587,284 | B2 * | 7/2003 | Santo et al. | 359/824 |
| 6,608,411 | B2 | 8/2003 | Horng et al. | 310/68 R |
| 6,664,664 | B2 * | 12/2003 | Botos et al. | 310/12.25 |
| 6,714,004 | B2 | 3/2004 | Jagiella | 324/207.16 |
| 6,809,427 | B2 | 10/2004 | Cheung et al. | 290/1 R |
| 6,859,325 | B2 * | 2/2005 | Kato et al. | 359/618 |
| 6,947,228 | B2 * | 9/2005 | Kato | 359/813 |
| 7,164,255 | B2 | 1/2007 | Hui | 320/108 |
| 7,298,238 | B1 | 11/2007 | Eaton et al. | 336/200 |
| 7,304,446 | B2 * | 12/2007 | Wang et al. | 318/254.1 |
| 7,456,722 | B1 | 11/2008 | Eaton et al. | 336/200 |
| 7,476,999 | B2 * | 1/2009 | Friedland | 310/264 |
| 7,535,148 | B2 | 5/2009 | Harris et al. | 310/156.56 |
| 7,623,013 | B2 | 11/2009 | Lopatinsky et al. | 335/299 |
| 7,786,450 | B2 | 8/2010 | Zach et al. | 250/396 ML |
| 7,859,377 | B2 | 12/2010 | Kawarai | 336/83 |
| 7,870,665 | B2 | 1/2011 | Nomura et al. | 29/847 |
| 7,872,561 | B2 | 1/2011 | Matumoto | 336/200 |
| 7,907,043 | B2 | 3/2011 | Mori | 336/200 |
| 7,907,044 | B2 | 3/2011 | Tada et al. | 336/200 |
| 7,973,635 | B2 | 7/2011 | Baarman et al. | 336/222 |
| 7,986,063 | B2 | 7/2011 | Nakamura et al. | 310/40 MM |
| 7,999,650 | B2 | 8/2011 | Mori | 336/200 |
| 8,018,313 | B2 | 9/2011 | Tada et al. | 336/200 |
| 2002/0075575 | A1 * | 6/2002 | Santo et al. | 359/824 |
| 2003/0042570 | A1 | 3/2003 | Hanks | 257/531 |
| 2004/0027674 | A1 * | 2/2004 | Kato et al. | 359/618 |
| 2005/0024750 | A1 * | 2/2005 | Kato | 359/813 |
| 2005/0225951 | A1 * | 10/2005 | Kurakami | 361/749 |
| 2006/0131965 | A1 * | 6/2006 | Friedland | 310/12 |
| 2007/0052302 | A1 | 3/2007 | Cheung et al. | 310/12.12 |
| 2007/0113906 | A1 | 5/2007 | Sturman et al. | 137/625.65 |
| 2007/0296369 | A1 | 12/2007 | Yeh | 318/696 |
| 2008/0164840 | A1 | 7/2008 | Kato et al. | 320/108 |
| 2008/0246346 | A1 | 10/2008 | Harris et al. | 310/12.12 |
| 2009/0002117 | A1 | 1/2009 | Kawarai | 336/233 |
| 2009/0051476 | A1 | 2/2009 | Tada et al. | 336/105 |
| 2010/0277265 | A1 | 11/2010 | Sturman et al. | 335/267 |
| 2010/0295385 | A1 | 11/2010 | Hsu et al. | 310/12.18 |
| 2011/0006868 | A1 | 1/2011 | Banno et al. | 336/200 |
| 2011/0128109 | A1 | 6/2011 | Tada et al. | 336/200 |
| 2011/0133881 | A1 | 6/2011 | Nakajima et al. | 336/200 |
| 2012/0080974 | A1 * | 4/2012 | Tanimoto | 310/208 |
| 2012/0217835 | A1 * | 8/2012 | Chung et al. | 310/195 |

OTHER PUBLICATIONS

Epson, "The Seiko AGS Quartz Watch," Jan. 1988, http://www.epson.co.jp/e/company/milestones/19_ags.pdf, accessed on Aug. 3, 2009.

KeValeoTM, "Technology to Provide Green Power for Consumer Mobile Electronics," http://www.ciiis.com/kevaleo/technology,html, accessed on Aug. 3, 2009.

* cited by examiner

HARNESSING POWER THROUGH ELECTROMAGNETIC INDUCTION UTILIZING PRINTED COILS

CROSS-REFERENCE TO RELATED APPLICATIONS

This application is a continuation of U.S. patent application Ser. No. 12/554,550, filed Sep. 4, 2009, which is hereby incorporated by reference herein in its entirety.

BACKGROUND OF THE INVENTION

This is directed to systems for harnessing power through electromagnetic induction.

Traditional systems for harnessing power through electromagnetic induction involve wire coils, a magnet, and relative movement between the two. To achieve meaningful output power, a traditional system typically includes thick coils of wire that add to the system's overall size. Moreover, the wire coils and magnet of a traditional system are often housed in an inefficient manner that further adds to the system's overall size.

SUMMARY OF THE INVENTION

Systems for harnessing power through electromagnetic induction utilizing printed coils are provided. A system can include one or more moveable magnets adjacent to printed coils on a circuit. For example, a system can include one or more magnets that are operative to move alongside a circuit board that includes printed coils. The one or more magnets may move, for example, when a user shakes the system or when the user walks or runs while holding the device. The movement of the one or more magnets may create an electromotive force (e.g., a voltage) across the printed coils, and this force may be used to generate electric power.

Printed coils can be formed using any suitable technique for printing circuit boards. For example, printed coils can be formed by depositing copper on a substrate to form traces in the shape of coils or selectively etching copper from a substrate to form traces in the shape of coils. In some embodiments, a circuit board may include multiple layers and printed coils can be formed on two or more of the layers. In such embodiments, the coils may be electrically coupled using vias to create a coil array. In some embodiments, multiple circuit boards with printed coils may form stacks of circuit boards that are electrically coupled together to form a coil array.

One or more moveable magnets may be used to harness power through electromagnetic induction. For example, a system may include a single magnet adjacent to one side of a coil array. In another example, a system may include a first magnet adjacent to a side of a coil array and a second magnet adjacent to an opposite side of the coil array. The two magnets may move freely alongside the printed coils or they may be coupled together so that they move in unison.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Electromagnetic induction can cause an electromotive force across an array of printed coils on a circuit board when the array moves through a magnetic field. For example, a voltage potential may be measured when an array of printed coils moves relative to a magnet. The magnitude of the electromotive force, and the associated electrical power, may be the result of various factors. For example, the magnitude of the electromotive force may be based on the length of the conductor moving through the magnetic field (e.g., the number of turns in a printed coil). In some embodiments, coils can be printed on a circuit board in dense configurations that offer a greater concentration of coil turns. Moreover, coils printed on a circuit board may be more efficiently integrated with other components of a system and, therefore, allow for a generally smaller system.

Figure 1:
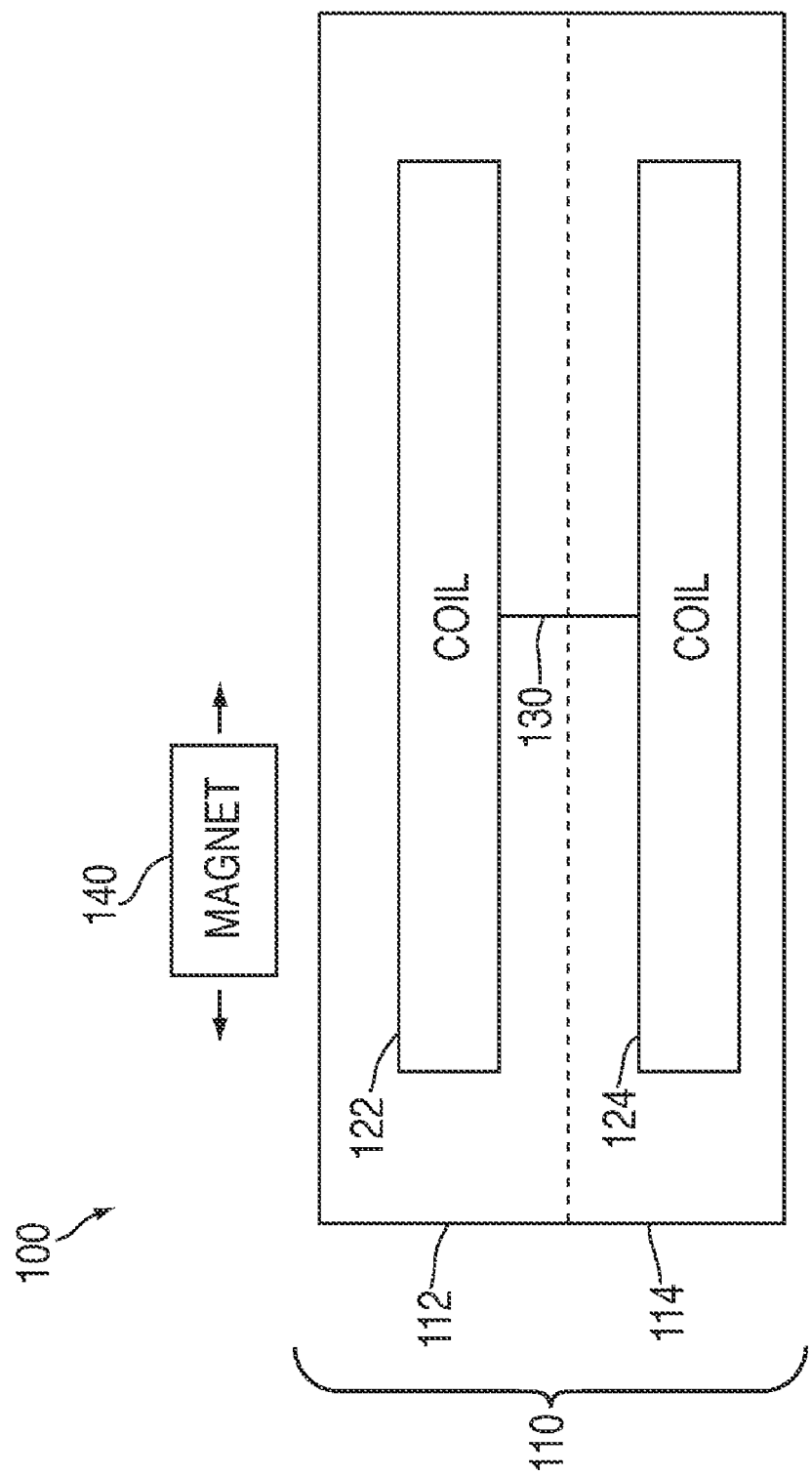
FIG. 1 is a schematic view of an illustrative electromagnetic induction system in accordance with one embodiment of the invention.

FIG. 1 includes electromagnetic induction system 100 in accordance with one embodiment of the invention. System 100 can include circuit board 110 with coil 122 and coil 124 printed thereon. System 100 can also include magnet 140 that may be operative to move adjacent to circuit board 110 and, therefore, coils 122 and 124 (see, e.g., arrows in FIG. 1). For example, magnet 140 may move adjacent to coils 122 and 124 when system 100 is shaken (e.g., through a user deliberately shaking the system). In another example, magnet 140 may move adjacent to coils 122 and 124 when a user carrying system 100 is walking or running (e.g., through movement created by the user's footfalls or arm swinging). Due to electromagnetic induction, an electromotive force may be generated in coils 122 and 124 when magnet 140 moves adjacent to circuit board 110.

Circuit board 110 can include one or more suitable substrates and traces may be formed on the substrate or substrates using any suitable process. For example, circuit board 110 can include a dielectric substrate bonded to a layer of copper and selected portions of the copper layer may be removed to form traces. Circuit board 110 can include multiple layers and each layer can include different traces. For example, circuit board 110 can include layer 112 with traces and layer 114 with different traces. Traces on circuit board 110 can be formed from any suitable conductive material (e.g., copper) using any suitable technique (e.g., etching). Circuit board 110 can include one or more vias for electrically coupling traces on different layers. For example, circuit board 110 can include via 130 that electrically couples one or more traces on layer 112 with one or more traces on layer 114. Vias in circuit board 110 can be formed from any suitable conductive material (e.g., copper) using any suitable technique (e.g., electroplating).

A circuit board can include one or more coils. For example, circuit board 110 can include coil 122 and coil 124. A trace can be printed in a pattern to form a relatively flat coil on a substrate of a circuit board. For example, each of coils 122 and 124 may be formed from one or more traces printed on circuit board 110. Different coils may be located on different layers of a circuit board. For example, one or more traces printed on layer 112 can form coil 122, and one or more traces printed on layer 114 can form coil 124. Coils located on different layers may be electrically coupled through one or more vias. For example, coil 122 may be electrically coupled with coil 124 through via 130. Electrically coupled together, coil 122 and coil 124 may form a coil array.

An electromagnetic induction system may include a magnet moveable adjacent to one or more coils. For example, system 100 can include magnet 140 moveable alongside circuit board 110. As a magnet moves adjacent to one or more coils, electromagnetic induction may generate an electromotive force across the coils. Any suitable type of magnet can be used to harness power in an electromagnetic induction system. For example, magnet 140 may include any object that produces magnetic fields. In some embodiments, magnet 140 may include a permanent magnet.

Figure 2:
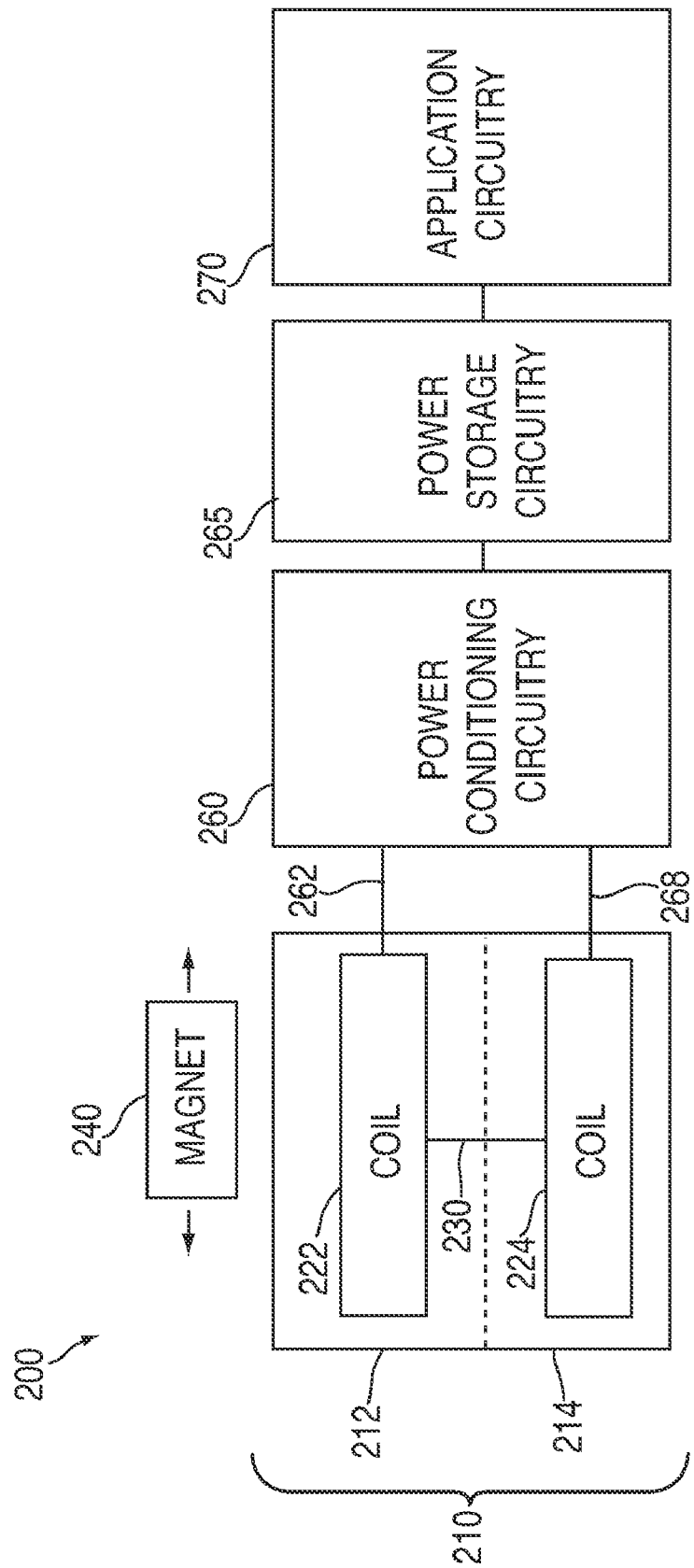
FIG. 2 is a schematic view of an illustrative electromagnetic induction system in accordance with one embodiment of the invention.

In some embodiments, an electromagnetic induction system may include circuitry in addition to a circuit board with printed coils and a magnet. FIG. 2 includes electromagnetic induction system 200 in accordance with one embodiment of the invention. System 200 can include circuit board 210 with coil 222 printed on layer 212, coil 224 printed on layer 214, and via 230 electrically coupling coils 222 and 224. Board 210, layers 212 and 214, coils 222 and 224, and via 230 may be substantially similar to board 110, layers 112 and 114, coils 122 and 124, and via 130 (see FIG. 1), and the previous description of the latter can be applied to the former.

An electromagnetic system can include power conditioning circuitry for regulating power harnessed by the system. For example, system 200 can include power conditioning circuitry 260. In some embodiments, power conditioning circuitry 260 may stabilize the voltage of an electromotive force generated across a coil. In some embodiments, power conditioning circuitry 260 may rectify electric power generated by electromagnetic induction. In some embodiments, power conditioning circuitry 260 may limit the current flowing through coils 222 and 224. Power conditioning circuitry 260 may be electrically coupled with the coils in circuit board 210. Power conditioning circuitry may couple with the coils in a circuit board to complete a conductive loop through the coils. For example, power conditioning circuitry 260 may be electrically coupled with coil 222 through conductive path 262 and coil 224 through conductive path 268. Conductive path 262 and conductive path 268 can include any suitable conductor. For example, conductive paths 262 and 268 can include traces on a circuit board, connectors, wires, or any combination thereof. While the embodiment shown in FIG. 2 portrays coil 222 and coil 224 configured in series and coupled with power conditioning circuitry 260, it is understood that any suitable configuration of coils can be coupled with power conditioning circuitry. For example, coils can be coupled in series, parallel, or any combination thereof to form an array of coils, and the coil array can be coupled with power conditioning circuitry.

An electromagnetic induction system can include power storage circuitry for storing power harnessed by the system. For example, system 200 can include power storage circuitry 265 that can be electrically coupled with power conditioning circuitry 260. Power storage circuitry 265 may include one or more circuit elements suitable for storing electrical power. For example, power storage circuitry 265 may include a large capacitor or battery. In some embodiments, power storage circuitry 265 may include circuitry limiting the flow of power out of a circuit element (e.g., a capacitor or battery). For example, power storage circuitry 265 may include circuitry for limiting the speed at which power can be drained from a circuit element.

An electromagnetic induction system can include application circuitry for using power harnessed by the system. For example, system 200 can include application circuitry 270. Application circuitry 270 can be electrically coupled with power storage circuitry 265, power conditioning circuitry 260, or both. Application circuitry 270 can include any suitable circuitry for performing electronic functions using power harnessed by the system. For example, application circuitry 270 may include a processor, memory, an input/output interface, any other suitable circuitry, or any combination thereof. In some embodiments, application circuitry 270 may include circuitry for playing media, circuitry for conducting wireless communications (e.g., cellular or 802.11x), any other suitable function, or any combination thereof. In some embodiments, system 200 can be incorporated into an electronic device. For example, system 200 can be incorporated into a media player such as an iPod® available from Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a cyclocomputer, a music recorder, a video recorder, a camera, or any other suitable electronic device.

Figure 3A:
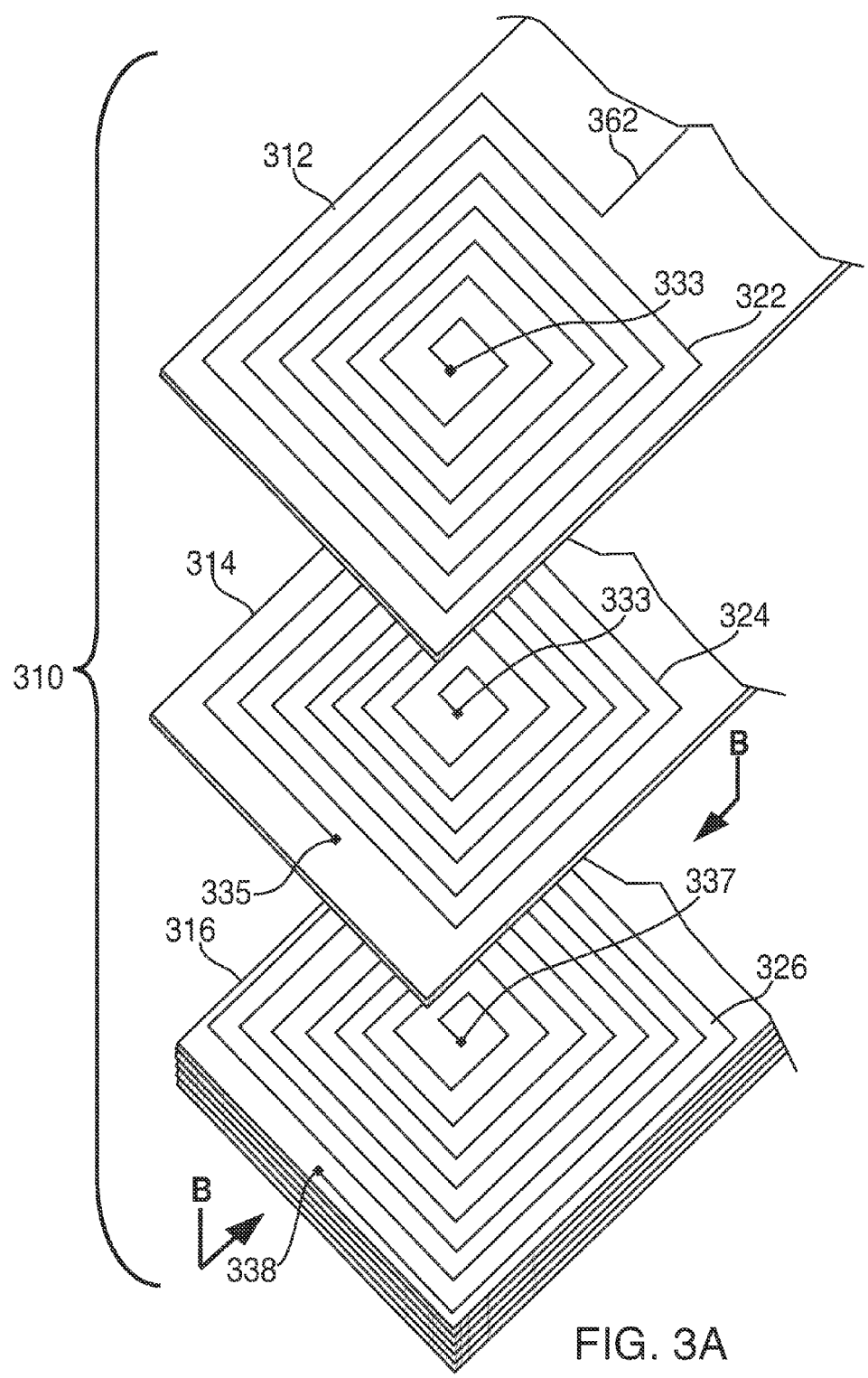
FIG. 3A is a perspective view of an illustrative, partially exploded circuit board in accordance with one embodiment of the invention.
Figure 3B:
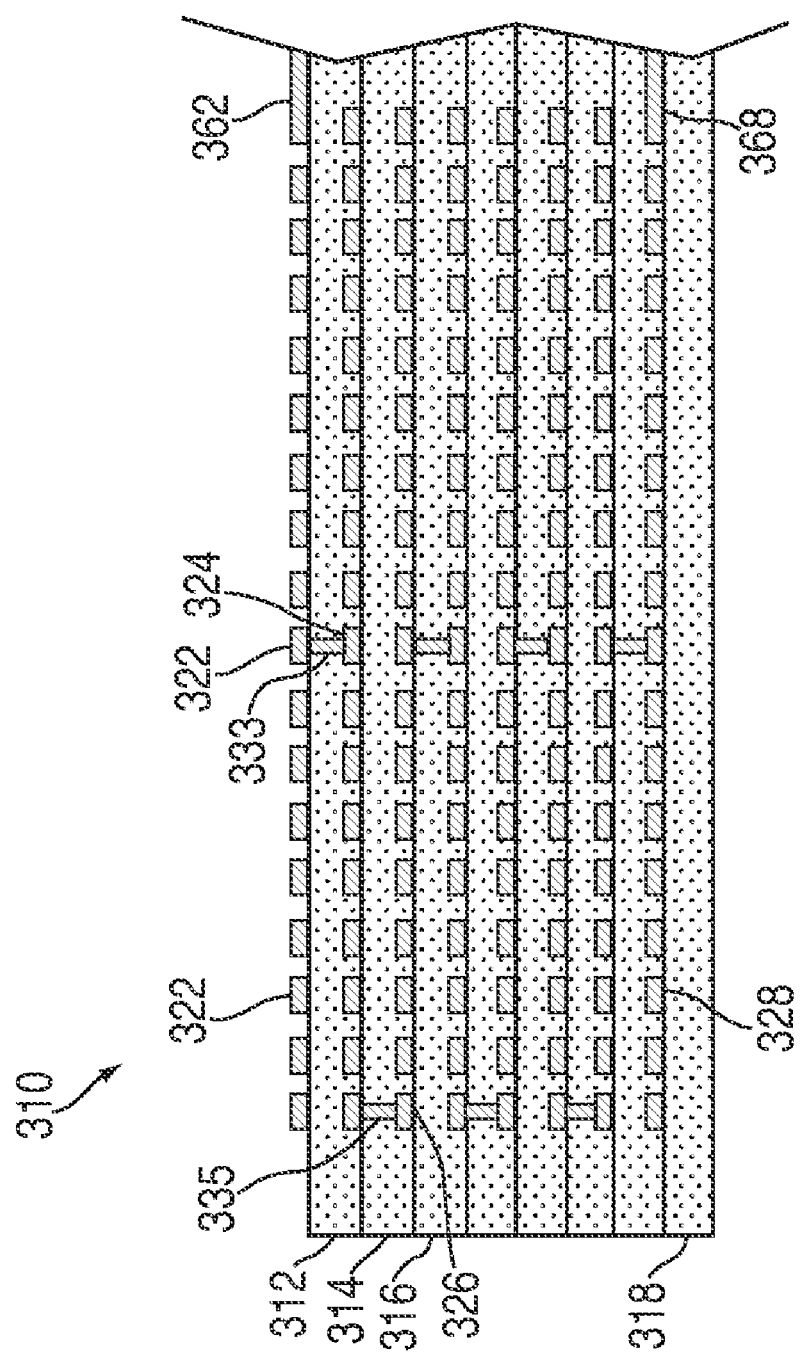
FIG. 3B is a cross-sectional view of an illustrative circuit board in accordance with one embodiment of the invention.

FIGS. 3A and 3B include circuit board 310 in accordance with one embodiment of the invention. Circuit board 310 can include multiple layers (see, e.g., layers 112 and 114 shown in FIG. 1). Each layer of circuit board 310 can include a conductive trace forming a coil for electromagnetic induction (see, e.g., coils 122 and 124 shown in FIG. 1).

A circuit board may include multiple layers, and two or more of the layers may include traces forming coils for electromagnetic induction. FIG. 3A is a perspective, partially exploded view of circuit board 310 in which the top two layers of circuit board 310 have been lifted to show conductive traces forming coils. While only the top two layers of circuit board 310 have been lifted in FIG. 3A and FIG. 3B shows only seven layers, it is understood that circuit board 310 can include any number of layers.

Circuit board 310 can include layers 312, 314, and 316, and each layer may include a printed coil formed from a conductive trace. For example, layer 312 may include coil 322, layer 314 may include coil 324, and layer 316 may include coil 326. A conductive trace can be printed on a layer in any suitable pattern to form a coil. For example, circuit board 310 includes coils 322, 324, and 326 formed from conductive traces printed in a square pattern. In another example, a circuit board can include coils formed from conductive traces printed in a circular pattern. Printed coils can include inner turns and outer turns. For example, a printed coil can include an inner turn which has the smallest radius of any turns in the coil and an outer turn which has the largest radius of any turns in the coil. In some embodiments, each circuit board may include a periphery (e.g., a side edge) and a coil's outer turn may runs alongside the periphery of the board (see, e.g., coils 322, 324, and 326 extending to the periphery of circuit board 310). In such embodiments, the coils may have a larger size, and potentially more turns, by extending to the periphery of the circuit board. In other embodiments, a circuit board may include other circuit or components and coils may not extend all the way to the periphery of the board.

A circuit board may include vias to electrically couple coils on different layers (see, e.g., via 130 shown in FIG. 1). A via may include a conductive path extending through a layer so that a trace on that layer is electrically coupled with a trace on an adjacent layer. For example, circuit board 310 may include via 333 to electrically couple coil 322 with coil 324. In another example, circuit board 310 may include via 335 to electrically couple coil 324 with coil 326. A circuit board can include a via at any suitable location on a layer. For example, circuit board 310 can include via 333 at the center of coil 322 (e.g., at an inner turn of the coil) and via 337 at the center of coil 326 (e.g., at an inner turn of the coil). In another example, circuit board 310 can include via 336 along the periphery of coil 324 (e.g., at the outer turn of the coil). In the embodiment shown in FIGS. 3A and 3B, the coils may be positioned directly on top of one another, and the location of the vias may alternate between the center of a coil and the periphery of a coil. In other embodiments, the coils may be positioned so that the each layer's coil is offset from the previous layer, and the vias may be located in the same relative position on each layer (e.g., the center of each coil).

A circuit board may include endpoint traces for electrically coupling coils with circuitry (see, e.g., conductive paths 262 and 268 shown in FIG. 2). For example, a circuit board may include endpoint traces for coupling an array of coils with power conditioning circuitry (see, e.g., circuitry 260 shown in FIG. 2). A circuit board may include an endpoint trace for electrically coupling a coil on a top layer with circuitry and another endpoint trace for electrically coupling a coil on a bottom layer with circuitry. For example, as seen in FIGS. 3A and 3B, circuit board 310 may include endpoint trace 362 for coupling coil 322 with circuitry (not shown). Continuing the example, as seen in FIG. 3B, circuit board 310 may include endpoint trace 368 on bottom layer 318 for coupling coil 328 with circuitry (not shown). If each coil in a circuit board is electrically coupled with coils on adjacent layers through vias and the top and bottom layers are coupled with power conditioning circuitry, the array of coils may form a closed loop through the power conditioning circuitry. As previously discussed, the coils may be coupled in series, parallel, or any combination thereof to form an array of coils, and such an array may be coupled with power conditioning circuitry through endpoint traces.

While the pattern of a conductive trace may vary, it may be advantageous for a conductive path to extend in the same general angular direction (e.g., clockwise or counter-clockwise) over an entire coil array. In the embodiment shown in FIG. 3A, the conductive path of circuit board 310 can extend in a counter-clockwise direction through each layer of circuit board 310. Starting from endpoint trace 362, the conductive path can wind through coil 322 in a counter-clockwise direction towards the center of layer 312. Upon reaching via 333, the conductive path can extend to layer 314, where it can wind through coil 324 in a counter-clockwise direction towards the periphery of layer 314. Upon reaching via 335, the conductive path can extend to layer 316 where it can wind through coil 326 in a counter-clockwise direction towards the center of layer 316. The conductive path can continue moving through the coil array in a generally counter-clockwise angular direction until reaching endpoint trace 368 (see FIG. 3B), where it can electrically couple with circuitry (see, e.g., conductive path 268 and power conditioning circuitry 260). In other embodiments, a conductive path may extend in a generally clockwise direction. It may, however, be disadvantageous for a conductive path to switch between extending in a clockwise and a counter-clockwise direction. For example, the electromotive forces generated through electromagnetic induction may cancel each other if the conductive path changes angular directions.

Figure 4:
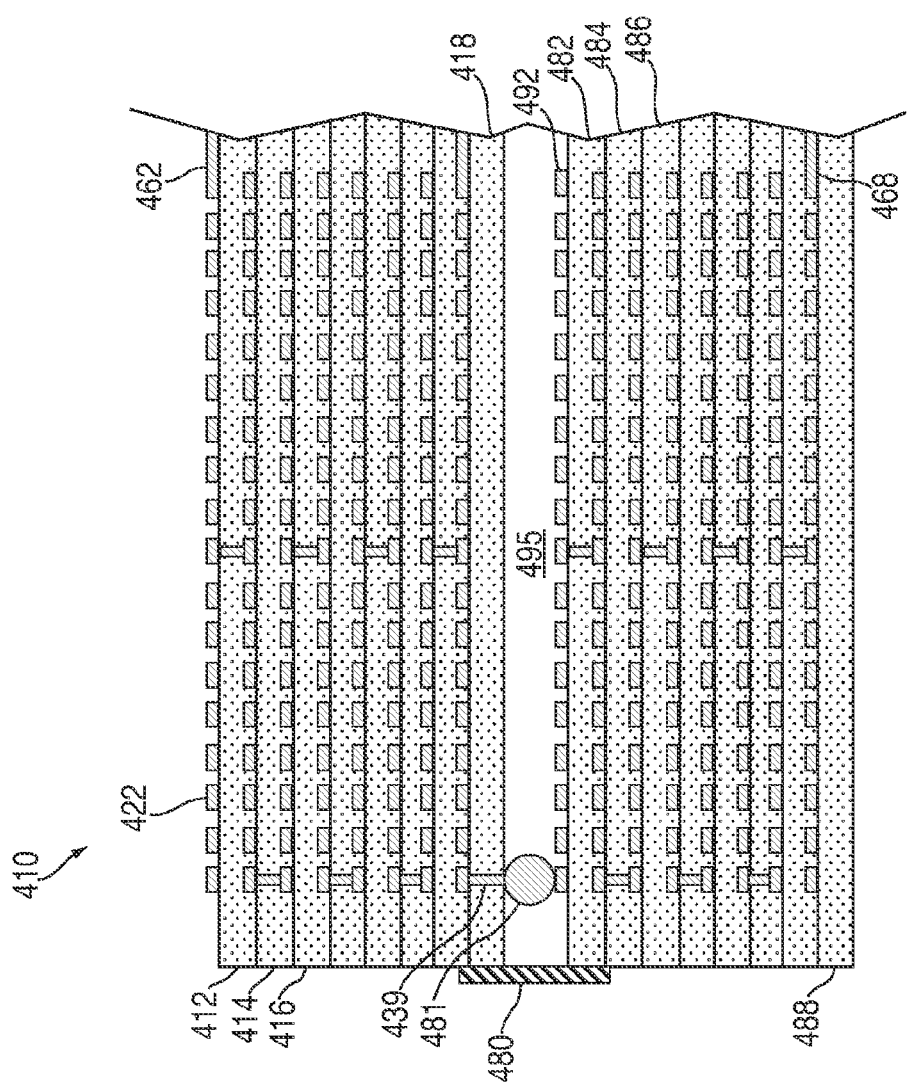
FIG. 4 is a cross-sectional view of an illustrative circuit board array in accordance with one embodiment of the invention.

In some embodiments, multiple circuit boards can be stacked and an array of coils can extend from one circuit board to another. For example, circuit boards in a stack can be electrically coupled through a conductor that allows a coil array to extend across multiple circuit boards. FIG. 4 includes circuit board stack 410 in accordance with one embodiment of the invention. Circuit board stack 410 can include multiple circuit boards, and each circuit board can include multiple layers (see, e.g., layers 112 and 114 shown in FIG. 1). Each layer of a circuit board in stack 410 can include a conductive trace forming a coil for electromagnetic induction (see, e.g., coils 122 and 124 shown in FIG. 1), and each coil may be coupled with adjacent coils through vias (see, e.g., via 130 shown in FIG. 1).

The top circuit board of stack 410 can be substantially similar to circuit board 310 (shown in FIGS. 3A and 3B) and can include layers 412, 414, 416, and 418, coil 422, and endpoint trace 462, which each correspond to, respectively, layers 312, 314, 316, and 318, coil 322, and endpoint trace 362 of circuit board 310. The top board of stack 410, however, can include via 439 extending through bottom layer 418 of the top circuit board. Another potential difference between circuit board 310 (shown in FIGS. 3A and 3B) and the top circuit board of stack 410 may be the absence of an endpoint trace along bottom layer 418. The function of an endpoint trace may be replaced by endpoint trace 468 located on bottom layer 488 of the bottom circuit board.

The bottom circuit board of stack 410 can also be substantially similar to circuit board 310 (shown in FIGS. 3A and 3B) and can include layers 482, 484, 486, and 488, coil 492, and endpoint trace 468, which each correspond to, respectively, layers 312, 314, 316, and 318, coil 322, and endpoint trace 362 of circuit board 310. A potential difference between circuit board 310 (shown in FIGS. 3A and 3B) and the bottom circuit board of stack 410 may be the absence of an endpoint trace along top layer 482. The function of an endpoint trace may be replaced by endpoint trace 462 located on top layer 412 of the top circuit board.

A circuit board stack may include one or more conductors for electrically coupling the circuit boards. For example, stack 410 may include conductor 481 for coupling via 439 with the periphery of coil 492. Accordingly, the coil array can extend in series from the top circuit board to the bottom circuit board. Conductor 481 can be a solder ball or any other suitable type of conductor for electrically coupling circuit boards.

A circuit board stack may include one or more mechanical couplings for holding the circuit boards together. For example, stack 410 may include bracket 480 coupled with both the top and bottom circuit boards in the stack. While the embodiment shown in FIG. 4 includes a bracket along an edge of the stack, it is understood that any other suitable mechanical coupling or combination of couplings can be used. For example, circuit boards may be coupled together using brackets along multiple edges of a stack. In another example, circuit boards may be coupled together using adhesive injected in gap 495 between the boards.

In some embodiments, it may be advantageous for a circuit board (see, e.g., circuit board 310 shown in FIGS. 3A and 3B) or a stack of circuit boards (see, e.g., stack 410) to include an even number of layers. This is because such a configuration may allow an endpoint trace (see, e.g., conductive paths 262 and 268 shown in FIG. 2, endpoint traces 362 and 368 shown in FIGS. 3A and 3B, and endpoint traces 462 and 468) to couple with the coil array at the periphery of a coil and, therefore, efficiently share a layer of a circuit board with the coil. On the other hand, if a coil array spans an odd number of layers, an extra layer may be necessary for an endpoint trace to couple with the coil array at the center of a coil.

In some embodiments, multiple coils can be provided on a single layer of a circuit board. For example, two or more coils can be provided adjacent to each other on a single layer of a circuit board. In such embodiments, two or more layers of a circuit board can each include multiple coils, and some of the coils on adjacent layers may be electrically coupled through vias.

Figure 5:
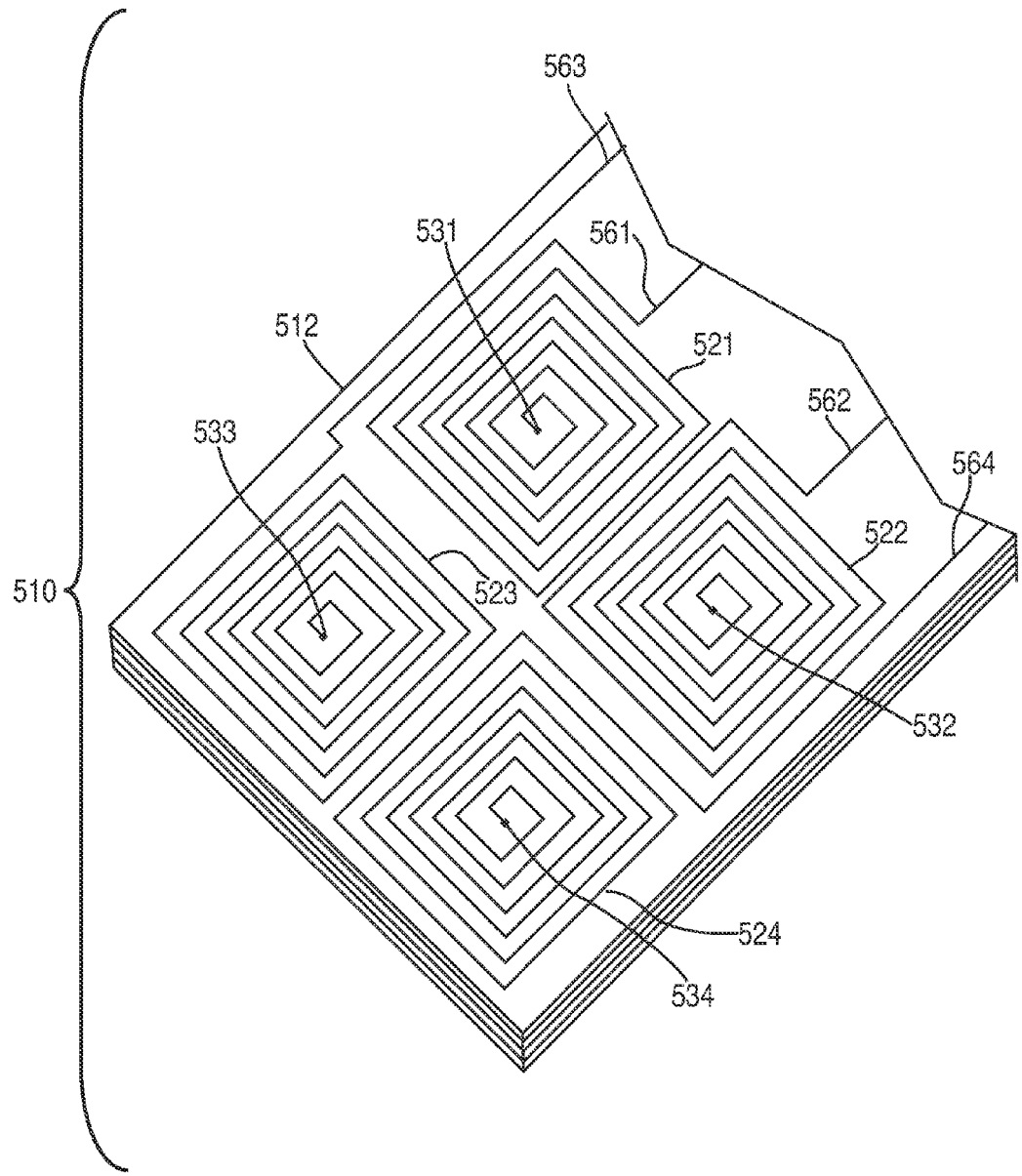
FIG. 5 is a perspective view of an illustrative circuit board in accordance with one embodiment of the invention.

FIG. 5 includes circuit board 510 in accordance with one embodiment of the invention. Circuit board 510 can include any suitable type of circuit board (see, e.g., circuit board 110 shown in FIG. 1). For example, circuit board 510 can include any number of layers and may be manufactured using any suitable technique. Circuit board 510 can include at least layer 512 (see, e.g., layer 112 shown in FIG. 1) with conductive traces printed thereon. As previously discussed, a layer of a circuit board can include multiple printed coils adjacent to each other. For example, layer 512 can include coil 521, coil 522, coil 523, and coil 524 formed from conductive traces (see, e.g., coils 122 and 124 shown in FIG. 1). Each of coils 521-524 may be substantially similar to coil 322 shown in FIGS. 3A and 3B, and the previous description of the latter can be applied to the former.

A circuit board with multiple coils on a single layer can include multiple vias on the same layer and each via may correspond to one of the coils. For example, circuit board 510 may include vias 531-534, each of which may electrically couple with one of coils 521-524. Vias 531-534 can include any suitable conductor passing through layer 512 (see, e.g., via 130 shown in FIG. 1). Each of vias 531-534 may electrically couple one of coils 521-524 with coils on a layer below layer 512 (see, e.g., vias 333 and 335 shown in FIGS. 3A and 3B). In this manner, a circuit board may include adjacent coils that span multiple layers by providing each layer with multiple, adjacent coils.

A circuit board with multiple coils on a single layer can include multiple endpoint traces on the same layer and each endpoint trace may correspond to one of the coils. For example, circuit board 510 may include endpoint traces 561-564, each of which may electrically couple with one of coils 521-524. Endpoint traces 561-564 can each include any suitable conductive path for electrically coupling a coil with circuitry (see, e.g., conductive paths 262 and 268 and power conditioning circuitry 260 shown in FIG. 2). In some embodiments, endpoint traces 561-564 may be provided on top layer 512 of circuit board 510 and similar endpoint traces (see, e.g., endpoint trace 368 shown in FIG. 3B) may be provided on the bottom layer of circuit board 510.

As previously discussed, coils can be coupled in series, parallel, or any combination thereof to form an array of coils. The resulting coil array can then be coupled with circuitry (e.g., power conditioning circuitry). In some embodiments, endpoint traces may be electrically coupled together (not shown) to form a parallel coil array of adjacent coils spanning multiple layers. In some embodiments, endpoint traces may be selectively coupled to form a series coil array of adjacent coils spanning multiple layers. For example, an endpoint trace may couple with an endpoint trace of an adjacent coil so that the conductive path can extend back through the circuit board. In such embodiments, it may be advantageous to reconfigure the angular direction of an adjacent coil so that the conductive path can maintain the same general angular direction throughout the array. For example, a coil may have a pattern that is a mirror image of an adjacent coil to which it is electrically coupled in series so that the conductive path can extend in the same general angular direction.

FIGS. 3A-5 show circuit boards with a single coil on each layer, stacks of circuit boards with a single coil on each layer, and circuit boards with multiple coils on each layer. It is understood, however, that any combination of these features can be used for electromagnetic induction without deviating from the disclosure. For example, a stack of circuit boards with multiple coils on each layer may be used for electromagnetic induction. In another example, rather than including multiple, adjacent coils on each layer of a circuit board, multiple circuit boards can be located adjacent to each other to provide adjacent coils for electromagnetic induction.

In some embodiments, a circuit board may be covered with a material on a side of the board adjacent to a magnet that is moveable relative to the board. For example, a circuit board may be covered with a dielectric material to insulate one or more traces on the top layer of the circuit board from the magnet. In another example, a circuit board may be covered with a relatively durable material to protect a circuit board from physical wear-and-tear due to the movement of a magnet alongside the board. In yet another example, a circuit board may be covered with a low-friction material to allow a magnet to move alongside the board with minimal resistance. Accordingly, a material with dielectric properties, durable properties, low-friction properties, any other suitable properties, or any combination thereof may cover one or more sides of a circuit board.

Figure 6:
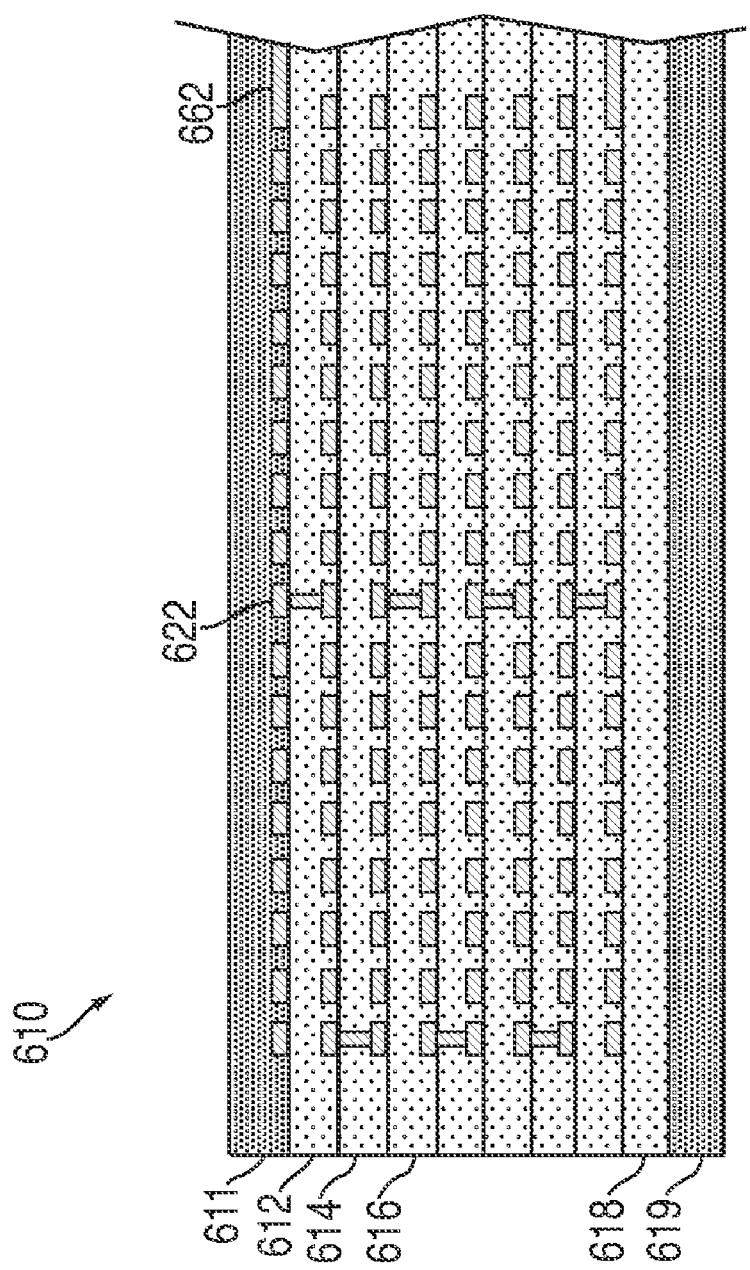
FIG. 6 is a cross-sectional view of an illustrative circuit board in accordance with one embodiment of the invention.

FIG. 6 includes circuit board 610 in accordance with one embodiment of the invention. Circuit board 610 can include multiple layers (see, e.g., layers 112 and 114 shown in FIG. 1). Each layer of circuit board 610 can include a conductive trace forming a coil for electromagnetic induction (see, e.g., coils 122 and 124 shown in FIG. 1), and each coil may be coupled with adjacent coils through vias (see, e.g., via 130 shown in FIG. 1).

Circuit board 610 can be substantially similar to circuit board 310 (shown in FIGS. 3A and 3B) and can include layers 612, 614, 616, and 618, coil 622, and endpoint trace 662, which each correspond to, respectively, layers 312, 314, 316, and 318, coil 322, and endpoint trace 362 of circuit board 310. Circuit board 610, however, can also include cover layer 611 over layer 612 and cover layer 619 below layer 618.

A layer can be formed on a side of a circuit board adjacent to a magnet that is moveable relative to the board (see, e.g., magnet 140 shown in FIG. 1). For example, layer 611 can be provided over layer 612. In some embodiments, layer 611 may be operative to insulate traces on layer 612 (e.g., coil 622 and endpoint trace 662) from a magnet moving adjacent to circuit board 610. In some embodiments, layer 611 may be operative to protect circuit board 610 from physical wear-and-tear due to the movement of a magnet alongside the board. In some embodiments, layer 611 may be operative to provide a smooth surface for a magnet to move alongside circuit board 610. Layer 611 can be formed from any suitable material. For example, layer 611 can be formed from a material with dielectric properties, durable properties, low-friction properties, any other suitable properties, or any combination thereof. In another example, layer 619 can be provided below layer 618. Layer 619 may be substantially similar to layer 611, and the previous description of the latter can be applied to the former. Layer 619 may be provided in embodiments when a magnet below a circuit board is moveable relative to the board. A more detailed description of such embodiments can be found, for example, in the discussion corresponding to FIGS. 10-18.

A layer can be formed on a side of a circuit board using any suitable technique. In some embodiments, a material may be applied to a side of the circuit board to form a layer. For example, a material may be applied to the top side of circuit board 610 to form a layer over coil 622 and endpoint trace 662. Such material may be applied so that it can fill in any uneven surfaces or gaps created by coil 622 and endpoint trace 662. A material may be applied to the side of a circuit board using any suitable process. For example, a material can be applied to the side of a circuit board using a technique that includes depositing, sputtering, painting, gluing, adhering, spray-coating, immersion-coating, any other suitable technique, or any combination thereof.

In some embodiments, an electromagnetic induction system can include an enclosure adjacent to a circuit board for guiding a moveable magnet. For example, an enclosure may be mounted onto a circuit board for guiding a moveable alongside the circuit board. An enclosure may prevent a magnet from moving too far away from the circuit board. For example, an enclosure may prevent a magnet from falling away from the circuit board if the board is flipped upside-down. In some embodiments, an enclosure may create a sealed environment for a moveable magnet to move through. For example, an enclosure may create a sealed environment and the environment may be filled with a lubricant to reduce the friction created by a moveable magnet.

Figure 7:
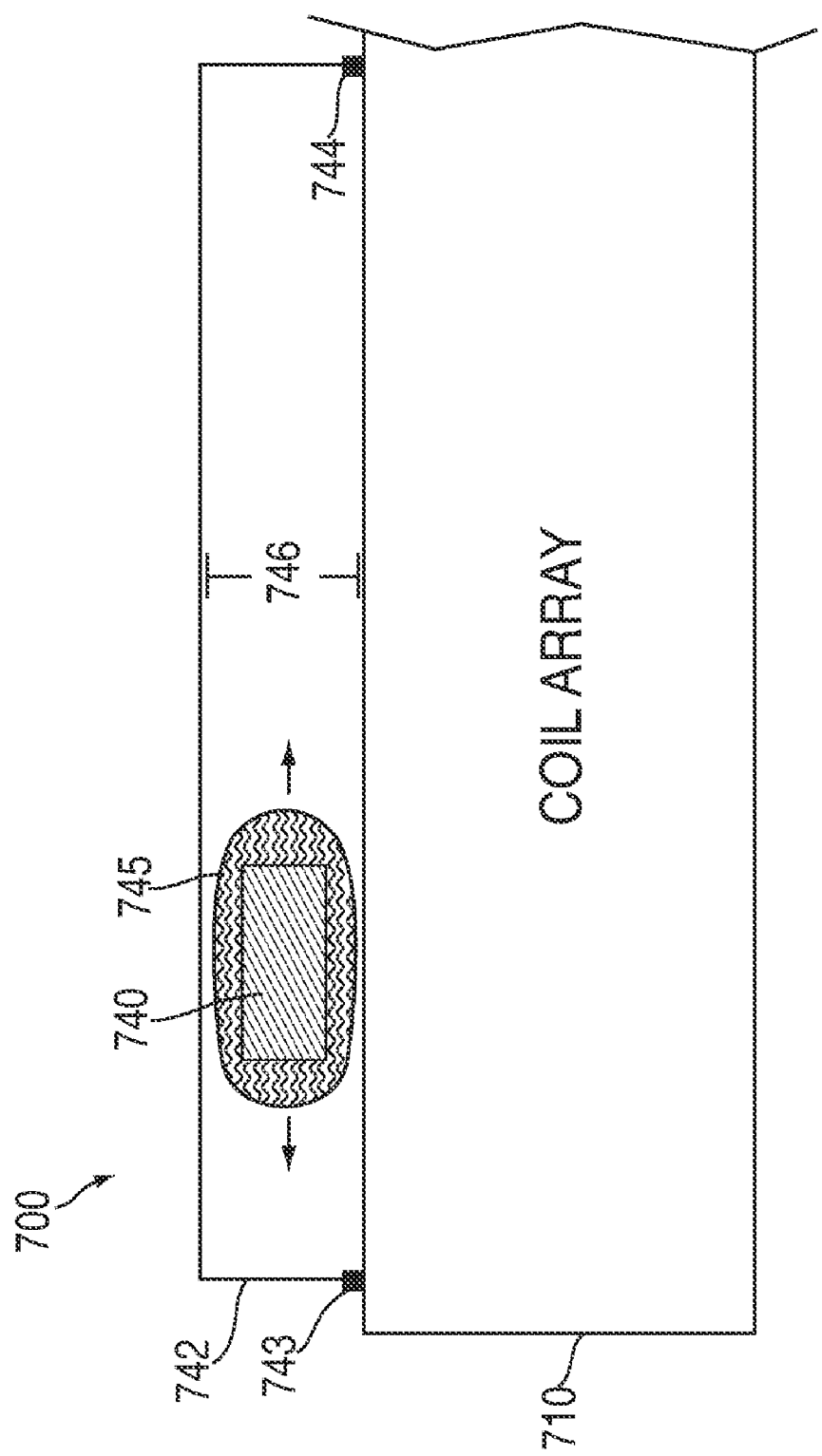
FIG. 7 is a schematic view of an illustrative electromagnetic induction system in accordance with one embodiment of the invention.

FIG. 7 includes electromagnetic induction system 700 in accordance with one embodiment of the invention. System 700 can include coil array 710 that may include any number of coils printed on any number of circuit boards (see, e.g., coils 122 and 124 and circuit board 110 shown in FIG. 1). For example, coil array 710 can include coils printed on different layers of a circuit board (see, e.g., FIGS. 3A and 3B), coils printed on different circuit boards in a stack (see, e.g., FIG. 4), coils printed on the same layer of a circuit board (see, e.g., FIG. 5), any other suitable configuration of coils, or any combination thereof.

As previously discussed, an electromagnetic induction system can include a magnet moveable adjacent to printed coils. For example, system 700 can include magnet 740 that can move along coil array 710. Magnet 740 can include any object that produces magnetic fields (see, e.g., magnet 140). In some embodiments, magnet 740 may include a permanent magnet.

An electromagnetic induction system can include an enclosure adjacent to printed coils. For example, system 700 can include enclosure 742 adjacent to coil array 710. Enclosure 742 may be shaped to guide magnet 740 alongside coil array 710 when it moves. For example, width 746 of enclosure 742 may be set so that magnet 740 moves alongside coil array 710 at a relatively close distance. Accordingly, enclosure 742 may retain magnet 740 in close proximity to coil array 710 while still allowing magnet 740 to move alongside coil array 710. An enclosure for guiding a magnet can be formed from any suitable material. For example, enclosure 742 can include plastics, polymers, polycarbonates, metals, any other suitable materials, or any combination thereof. In some embodiments, an enclosure for guiding a magnet may include a ferrite sheet for blocking a portion of the magnetic field from the magnet. For example, enclosure 742 may include a ferrite sheet to block the portion of the magnetic field from magnet 740 that extends away from coil array 710. It may be advantageous to block some of the magnetic field from a magnet in an electromagnetic induction system because stray magnetic fields may interfere with other circuitry in the induction system or an electronic device into which the induction system is integrated. For example, an electromagnetic induction system may be integrated into a small, portable electronic device that includes other circuitry (see, e.g., application circuitry 270 shown in FIG. 2) and the operation of the other circuitry may be disrupted by the magnetic field from the induction system's magnet.

In some embodiments, an enclosure in an electromagnetic induction system can be mounted to a physical structure in the system. For example, an enclosure may be mounted directly to a coil array or a bracket supporting the coil array. In some embodiments, an enclosure can be mounted to a physical structure at locations that provide mechanical support to prevent the enclosure from separating from the coil array. For example, an enclosure can be mounted to a physical structure at locations that include brackets for mechanical support. In the embodiment shown in FIG. 7, enclosure 742 may be mounted to coil array 710. An enclosure may be mounted to a coil array at any suitable location. For example, an enclosure may be mounted to one or more circuit boards that form a coil array. In some embodiments, an enclosure may be mounted to the periphery of one or more circuit boards that form a coil array (see, e.g., the periphery of layer 312 shown in FIG. 3A). For example, an enclosure may be mounted to the periphery of one or more circuit boards using a bracket that attaches to the edge of the circuit board. Mounting an enclosure to the periphery of a circuit board may be advantageous because it may expose the largest area of coils to the magnetic field. In some embodiments, an enclosure may be mounted to a layer covering a circuit board (see, e.g., layers 611 and 619 sown in FIG. 6).

In some embodiments, an enclosure in an electromagnetic induction system can be mounted to a physical structure in a manner that creates a sealed environment for a magnet to move through. For example, an enclosure may be airtight, a coil array may be formed on an airtight circuit board or include an airtight layer covering the circuit board, and the enclosure can be mounted to a physical structure at locations that include airtight seals. In the embodiment shown in FIG. 7, enclosure 742 may be mounted to coil array 710 at seal 743 and seal 744. Seals 743 and 744 may include any suitable material for forming an airtight seal. For example, seals 743 and 744 may include an adhesive, epoxy, glue, resin, sealant, solder, any other suitable material, or any combination thereof. Accordingly, magnet 740 can move through a sealed environment.

In some embodiments, an electromagnetic induction system may include a lubricant in a sealed environment created by an enclosure. For example, a system may include a lubricant to reduce the friction experienced by a moveable magnet. In some embodiments, a system may include a lubricant that includes a ferrofluid. For example, system 700 can include ferrofluid 745 in enclosure 742 for lubricating the movement of magnet 740. Ferrofluid 745 can include any liquid with one or more ferromagnetic properties. For example, ferrofluid 745 may be magnetically attracted to magnet 740 so that magnet 740 is coated by ferrofluid 745. Ferrofluid 745 may have lubricating properties to reduce the friction created by the movement of magnet 740. It may be advantageous to use a lubricant that includes ferrofluid because such a lubricant will be attracted to the magnet and, therefore, follow the magnet as it moves adjacent to the coils.

In some embodiments, the poles of a movable magnet may be positioned to maximize the magnetic field perpendicular to the printed coils in an electromagnetic induction system. The electromotive force (i.e., voltage) generated by electromagnetic induction may be proportional to the rate at which the flux passing through the coils changes. Accordingly, it may be advantageous to maximize the magnetic field perpendicular to the coils so that the change in flux is maximized when the magnet moves adjacent to the coils.

Figure 8:
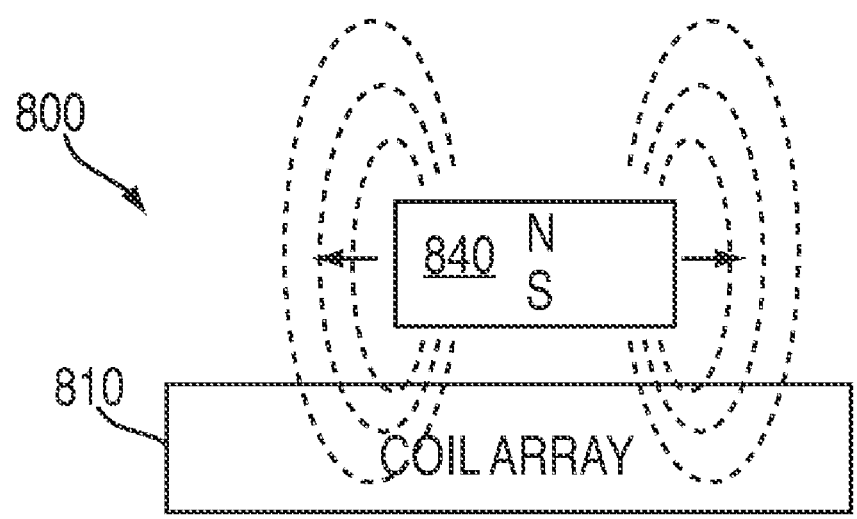
FIG. 8 is a schematic view, including exemplary magnetic field lines, of an illustrative electromagnetic induction system in accordance with one embodiment of the invention.
Figure 9:
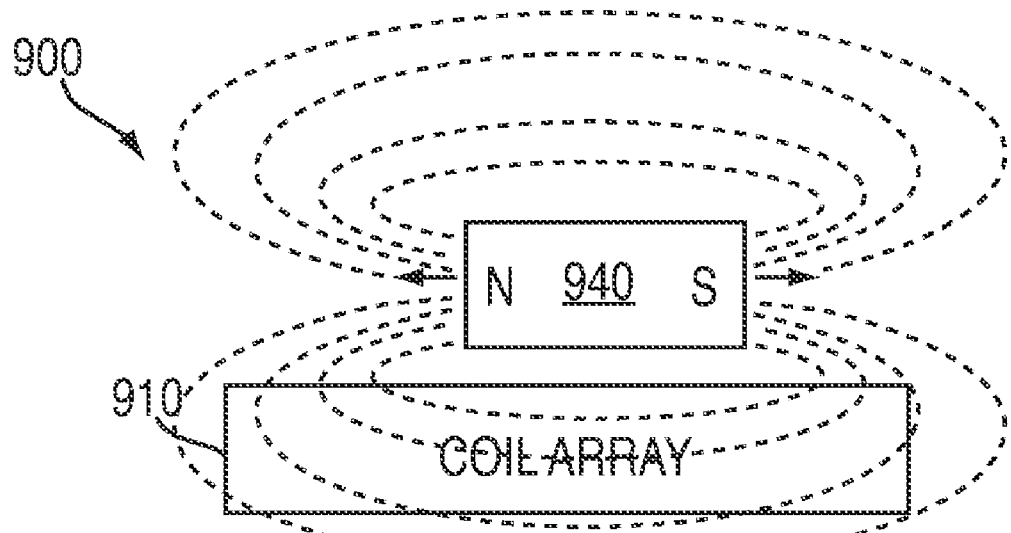
FIG. 9 is a schematic view, including exemplary magnetic field lines, of an illustrative electromagnetic induction system in accordance with one embodiment of the invention.

FIGS. 8 and 9 include, respectively, electromagnetic induction systems 800 and 900. Systems 800 and 900 may each include a coil array and a moveable magnet. For example, systems 800 and 900 may include, respectively, coil array 810 and coil array 910. Coil arrays 810 and 910 may each include any number of coils printed on any number of circuit boards (see, e.g., coils 122 and 124 and circuit board 110 shown in FIG. 1). Moreover, systems 800 and 900 may include, respectively, moveable magnet 840 and moveable magnet 940. Moveable magnets 840 and 940 may each include any object that produces magnetic fields (see, e.g., magnet 140 shown in FIG. 1). Magnets 840 and 940, however, may have different pole positions in FIGS. 8 and 9. For example, the poles of magnet 840 may be positioned vertically with the north pole directly over its south pole while the poles of magnet 940 may be positioned horizontally with its north pole to the left of its south pole. Therefore, FIGS. 8 and 9 display different magnetic field lines due to the different pole positions. As shown in the figures, a greater portion of the magnetic field of magnet 840 may be perpendicular to coil array 810 than the portion of the magnetic field of magnet 940 that is perpendicular to coil array 910. Accordingly, it may be advantageous to provide a magnet with poles positioned vertically, in a manner similar to magnet 840. But much of the magnetic field of magnet 840 may still go unused because it is either parallel with coil array 810 or returning to the side of magnet 840 that is opposite coil array 810.

In some embodiments, an electromagnetic induction system can include multiple moveable magnets adjacent to printed coils, at least two of which can be on different sides of the printed coils. For example, one moveable magnet may be adjacent to the top side of the printed coils and another moveable magnet may be adjacent to the bottom side of the printed coils. In some embodiments, the poles of magnets on opposite sides of printed coils may be positioned so that opposite poles face each other and the magnetic fields can extend in a relatively straight line between the magnets. It may be advantageous to position magnets on opposite sides of printed coils so that opposite poles face each other because such a configuration may cause the magnetic field to extend through the coils in a relatively straight line that is perpendicular to the coils.

Figure 10:
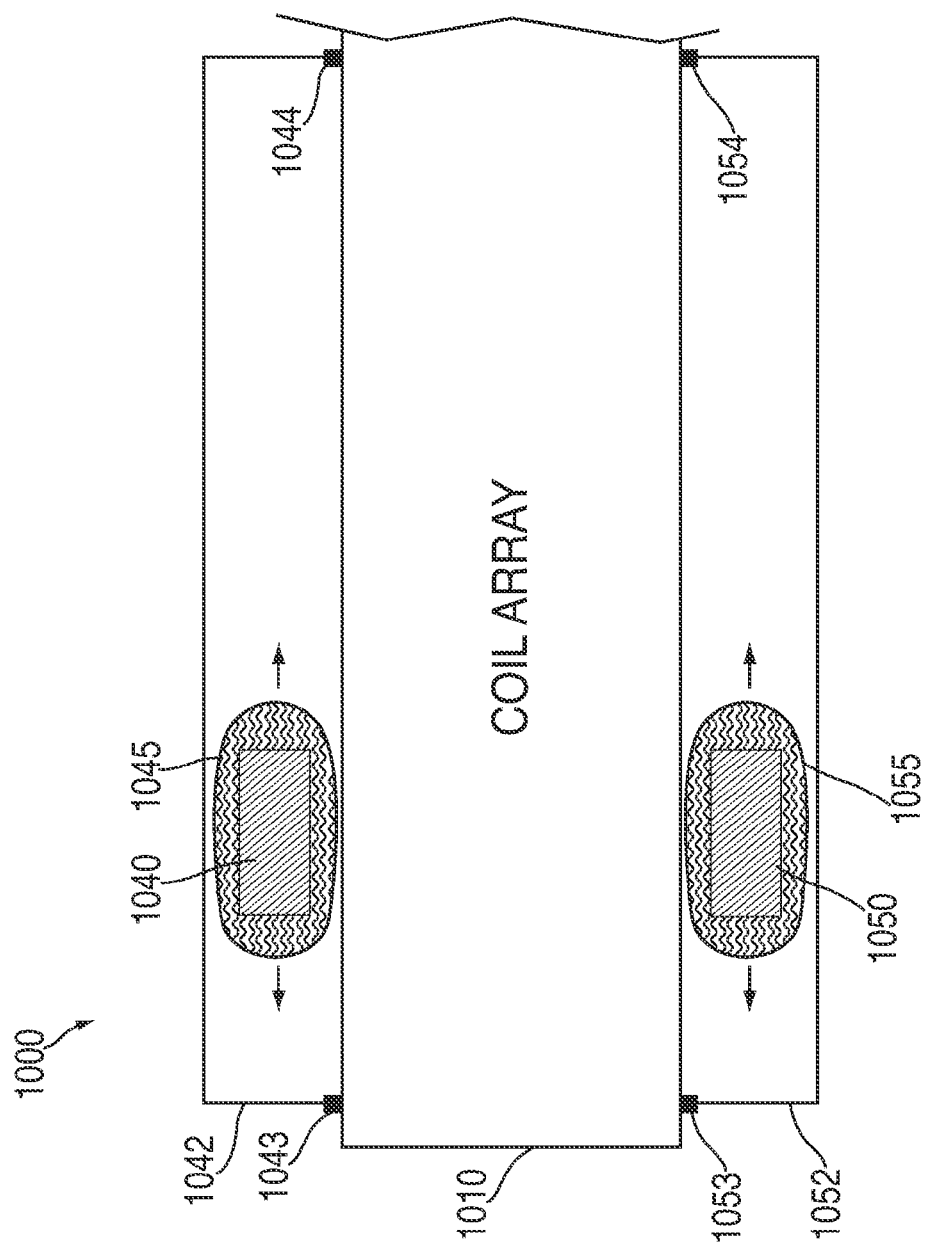
FIG. 10 is a schematic view of an illustrative electromagnetic induction system in accordance with one embodiment of the invention.

FIG. 10 includes electromagnetic induction system 1000 in accordance with one embodiment of the invention. System 1000 may be substantially similar to system 700 (shown in FIG. 7) and the previous description of the latter may be applied to the former. For example, system 1000 may include coil array 1010, magnet 1040, enclosure 1042, seals 1043 and 1044, and ferrofluid 1045, which may each correspond to, respectively, coil array 710, magnet 740, enclosure 742, seals 743 and 744, and ferrofluid 745. System 1000, however, may also include magnet 1050 adjacent to the bottom surface of coil array 1010. In some embodiments, magnet 1050, and any accompanying enclosures, seals, or ferrofluid near the bottom surface of coil array 1010 may be similar to magnet 1040, enclosure 1042, seals 1043 and 1044, and ferrofluid 1045 near the top surface of coil array 1010. For example, enclosure 1052 may be substantially similar to enclosure 1042, and seals 1053 and 1054 may be substantially similar to seals 1043 and 1044. Moreover, ferrofluid 1055 may be substantially similar to ferrofluid 1045.

In some embodiments, magnets on opposite sides of printed coils may be mechanically free to move along printed coils independently of each other. For example, there may be no brackets mechanically coupling magnet 1040 with magnet 1050. In such embodiments, the force of the magnets' magnetic fields may have a partially coupling effect by exerting forces that pull the magnets towards each other. In some embodiments, magnets on opposite sides of printed coils may be mechanically coupled to move along printed coils in unison. For example, system 100 may include a bracket mechanically coupling magnet 1040 with magnet 1050. A more detailed description of such embodiments as well as other embodiments to move magnets in unison can be found, for example, in the discussion corresponding to FIGS. 16-18.

Figure 11:
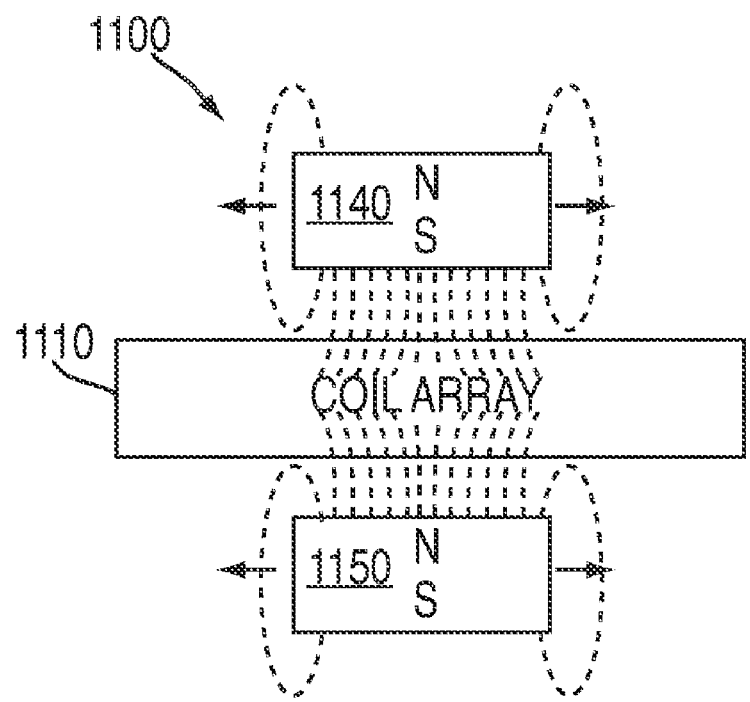
FIG. 11 is a schematic view, including exemplary magnetic field lines, of an illustrative electromagnetic induction system in accordance with one embodiment of the invention.
Figure 12:
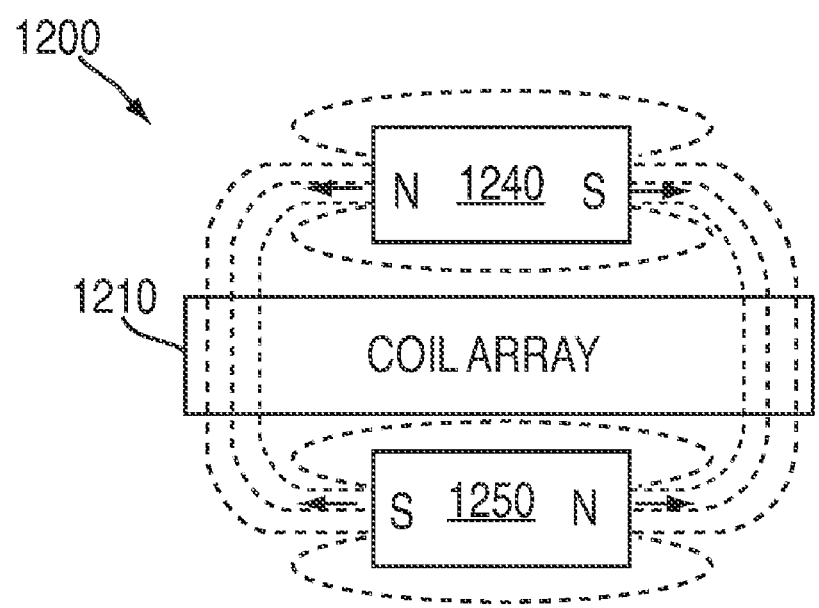
FIG. 12 is a schematic view, including exemplary magnetic field lines, of an illustrative electromagnetic induction system in accordance with one embodiment of the invention.

In some embodiments, the poles of movable magnets on opposite sides of printed coils may be positioned to maximize the magnetic field perpendicular to the coils in an electromagnetic induction system. FIGS. 11 and 12 include, respectively, electromagnetic induction systems 1100 and 1200. Systems 1100 and 1200 may each include a coil array and moveable magnets on opposite sides of the coils. For example, systems 1100 and 1200 may include, respectively, coil array 1110 and coil array 1210. Coil arrays 1110 and 1210 may each include any number of coils printed on any number of circuit boards (see, e.g., coils 122 and 124 and circuit board 110 shown in FIG. 1). Moreover, systems 1100 and 1200 may include, respectively, moveable magnets 1140 and 1150 and moveable magnets 1240 and 1250. Moveable magnets 1140, 1150, 1240, and 1250 may each include any object that produces magnetic fields (see, e.g., magnet 140 shown in FIG. 1). Magnets 1140, 1150, 1240, and 1250, however, may have different pole positions in FIGS. 11 and 12. For example, the poles of magnets 1140 and 1150 may be positioned vertically with the south pole of magnet 1140 facing the north pole of magnet 1150. On the other hand, the poles of magnets 1240 and 1250 may be positioned horizontally with the north pole of magnet 1240 facing the south pole of magnet 1250 and the south pole of magnet 1240 facing the north pole of magnet 1250. Therefore, FIGS. 11 and 12 display different magnetic field lines due to the different pole positions. As shown in the figures, a greater portion of the magnetic fields of magnets 1140 and 1150 may be perpendicular to coil array 1110 than the portion of the magnetic field of magnets 1240 and 1250 that is perpendicular to coil array 1210. Accordingly, it may be advantageous to provide magnets with poles positioned vertically and opposite poles facing each other, in a manner similar to magnets 1140 and 1150. Moreover, as seen by comparing system 1100 to system 800 (shown in FIG. 8), the addition of a magnet on the opposite side of printed coils can increase the density of the magnetic fields.

In some embodiments, an electromagnetic induction system may include printed coils and multiple moveable magnets adjacent to opposite sides of the printed coils. For example, an electromagnetic induction system may include two or more magnets adjacent to the top side of a printed coil array and two or more magnets adjacent to the bottom side of a printed coil array. It may be advantageous to include multiple moveable magnets adjacent to opposite sides of printed coils because the magnetic field passing through the printed coils may be increased by each additional magnet.

Figure 13:
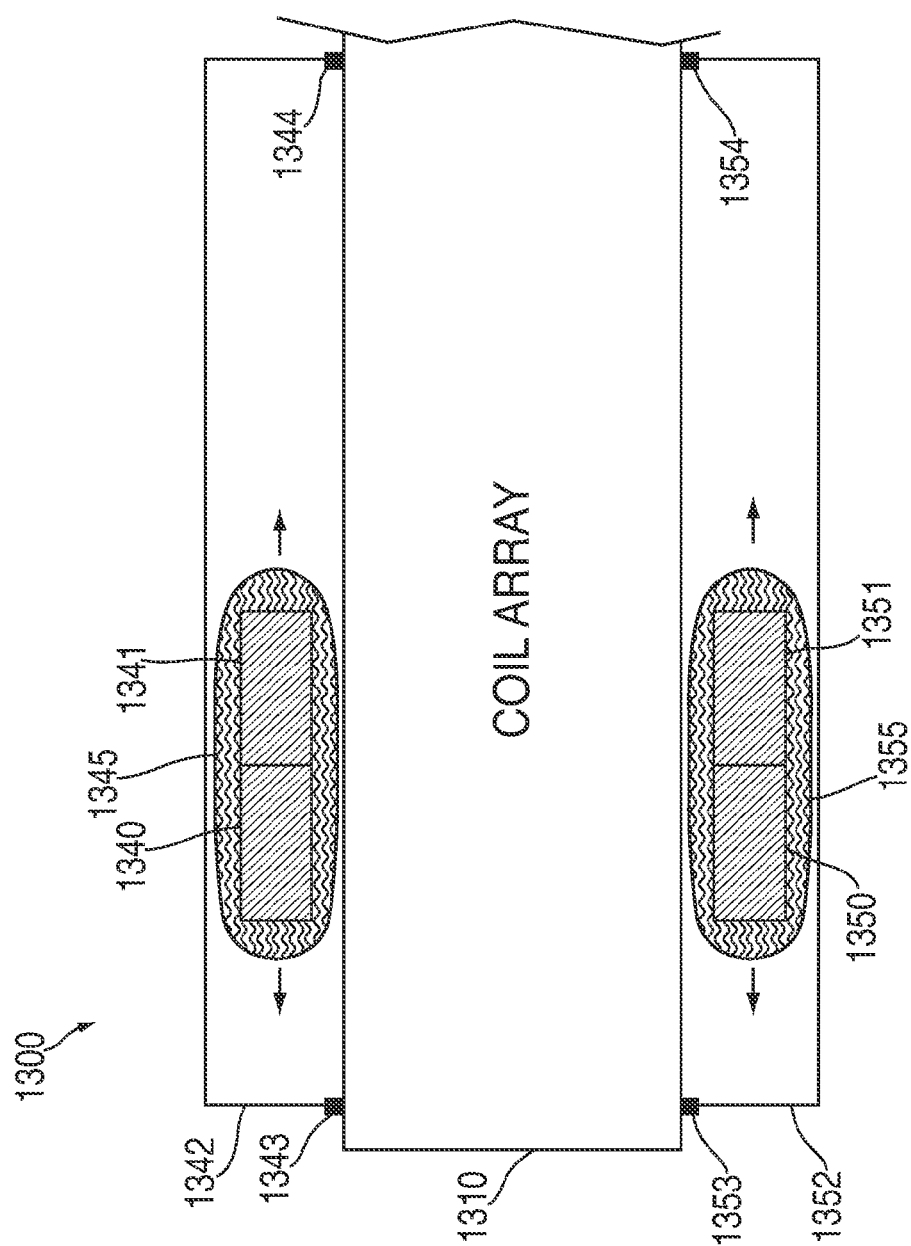
FIG. 13 is a schematic view of an illustrative electromagnetic induction system in accordance with one embodiment of the invention.

FIG. 13 includes electromagnetic induction system 1300 in accordance with one embodiment of the invention. System 1300 may be substantially similar to systems 700 (shown in FIG. 7) and 1000 (shown in FIG. 10) and the previous description of the latter systems may be applied to the former. For example, system 1300 may include coil array 1310, magnet 1340, enclosure 1342, seals 1343 and 1344, ferrofluid 1345, magnet 1350, enclosure 1352, seals 1353 and 1354, and ferrofluid 1355, each of which may each correspond to, respectively, coil array 1010, magnet 1040, enclosure 1042, seals 1043 and 1044, ferrofluid 1045, magnet 1050, enclosure 1052, seals 1053 and 1054, and ferrofluid 1055. Moreover, the magnets, enclosures, seals, and ferrofluid on opposite sides of coil array 1310 may correspond, respectively, to the magnet, enclosures, seals, ferrofluid on the top side of coil array 710 in system 700 (see, e.g., magnet 740, enclosure 742, seals 743 and 744, and ferrofluid 745). System 1300, however, may include an additional magnet adjacent to opposite sides of printed coils. For example, system 1300 may include magnet 1341 adjacent to the top side of coil array 1310 and magnet 1351 adjacent to the bottom side of coil array 1310.

In some embodiments, multiple magnets adjacent to a single side of printed coils may be of similar types and sizes. For example, magnet 1341 may be substantially similar to magnet 1340. In another example, magnet 1351 may be substantially similar to magnet 1350. In some embodiments, an enclosure may be shaped to guide multiple magnets alongside one side of printed coils. For example, enclosure 1342 may be shaped to guide magnet 1340 and magnet 1341 alongside the top side of coil array 1310. In another example, enclosure 1352 may be shaped to guide magnet 1350 and magnet 1351 alongside the bottom side of coil array 1310. In some embodiments, a system may include enough ferrofluid in an enclosure to lubricate multiple magnets. For example, ferrofluid 1345 may include enough ferrofluid to cover both magnet 1340 and magnet 1341 so that each magnet can move smoothly alongside coil array 1310. In another example, ferrofluid 1355 may include enough ferrofluid to cover both magnet 1350 and magnet 1351 so that each magnet can move smoothly alongside coil array 1310.

In some embodiments, multiple magnets adjacent to one side of printed coils may be coupled together so that they move across the coils in unison. For example, the magnets may be part of an assembly that moves as a single unit alongside the printed coils. Moreover, assemblies on opposite sides of printed coils may be coupled so that both assemblies move across the coils in unison. For example, in the embodiment shown in FIG. 13, magnets 1340 and 1341 may be coupled together so that they move in unison and magnets 1350 and 1351 may be coupled together so that they move in unison. In other embodiments, multiple magnets adjacent to one side of printed coils may move independently. For example, the magnets may move independently alongside the printed coils.

Figure 14:
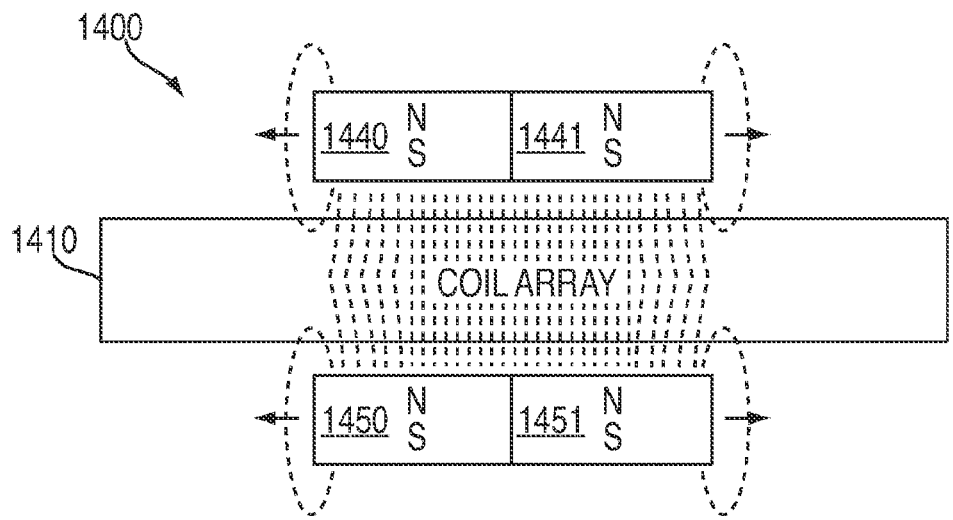
FIG. 14 is a schematic view, including exemplary magnetic field lines, of an illustrative electromagnetic induction system in accordance with one embodiment of the invention.
Figure 15:
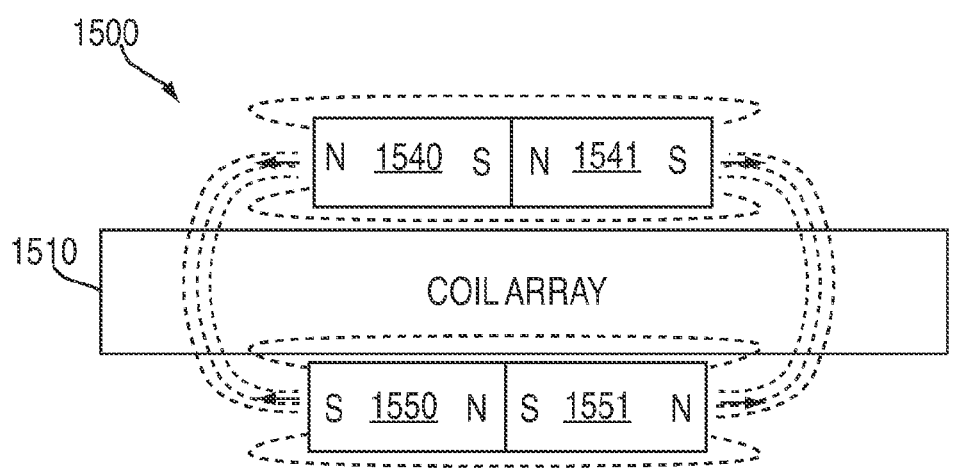
FIG. 15 is a schematic view, including exemplary magnetic field lines, of an illustrative electromagnetic induction system in accordance with one embodiment of the invention.

In some embodiments, the poles of multiple magnets located on the same side of printed coils may be positioned to maximize the magnetic field perpendicular to the coils. FIGS. 14 and 15 include, respectively, electromagnetic induction systems 1400 and 1500. Systems 1400 and 1500 may each include a coil array and multiple moveable magnets on opposite sides of the coils. For example, systems 1400 and 1500 may include, respectively, coil array 1410 and coil array 1510. Coil arrays 1410 and 1510 may each include any number of coils printed on any number of circuit boards (see, e.g., coils 152 and 154 and circuit board 110 shown in FIG. 1). Moreover, systems 1400 and 1500 may include, respectively, moveable magnets 1440, 1441, 1450, and 1451 and moveable magnets 1540, 1541, 1550, and 1551. Moveable magnets 1440, 1441, 1450, 1451, 1540, 1541, 1550, and 1551 may each include any object that produces magnetic fields (see, e.g., magnet 140 shown in FIG. 1). Magnets 1440, 1441, 1450, 1451, 1540, 1541, 1550, and 1551, however, may have different pole positions in FIGS. 14 and 15. In some embodiments, the pole positions of magnets 1440, 1441, 1450, and 1451 may be similar to the pole positions of magnets 1140 and 1150 (shown in FIG. 11), and the pole positions of magnets 1540, 1541, 1550, and 1551 may be similar to the pole positions of magnets 1240 and 1250 (shown in FIG. 12). For example, the poles of magnets 1440, 1441, 1450, and 1451 may be positioned vertically with the south poles of magnets 1440 and 1441 facing the north poles of magnet 1450 and 1451. On the other hand, the poles of magnets 1540, 1541, 1550, and 1551 may be positioned horizontally with the north pole of magnet 1540 facing the south pole of magnet 1550, the south pole of magnet 1540 facing the north pole of magnet 1550, the north pole of magnet 1541 facing the south pole of magnet 1551, and the south pole of magnet 1541 facing the north pole of magnet 1551. Therefore, FIGS. 14 and 15 display different magnetic field lines due to the different pole positions. As shown in the figures, a greater portion of the magnetic fields of magnets 1440, 1441, 1450, and 1451 may be perpendicular to coil array 1410 than the portion of the magnetic field of magnets 1540, 1541, 1550, and 1551 that is perpendicular to coil array 1510. Accordingly, it may be advantageous to position the poles of the magnets vertically with opposite poles facing each other across the printed coils, in a manner similar to magnets 1440, 1441, 1450, and 1451. Moreover, the portion of the magnetic fields of magnets 1440, 1441, 1450, and 1451 that is perpendicular to coil array 1410 may be greater than the portion of the magnetic fields of magnets 1140 and 1150 that is perpendicular to coil array 1110 (shown in FIG. 11). Accordingly, it may be advantageous to provide multiple magnets on each opposite side of printed coils.

As previously discussed, magnets on opposite sides of printed coils may be mechanically coupled to move along printed coils in unison in some embodiments. For example, one or more magnets on a top side of printed coils may be mechanically coupled with one or more magnets on the bottom side of printed coils.

Figure 16:
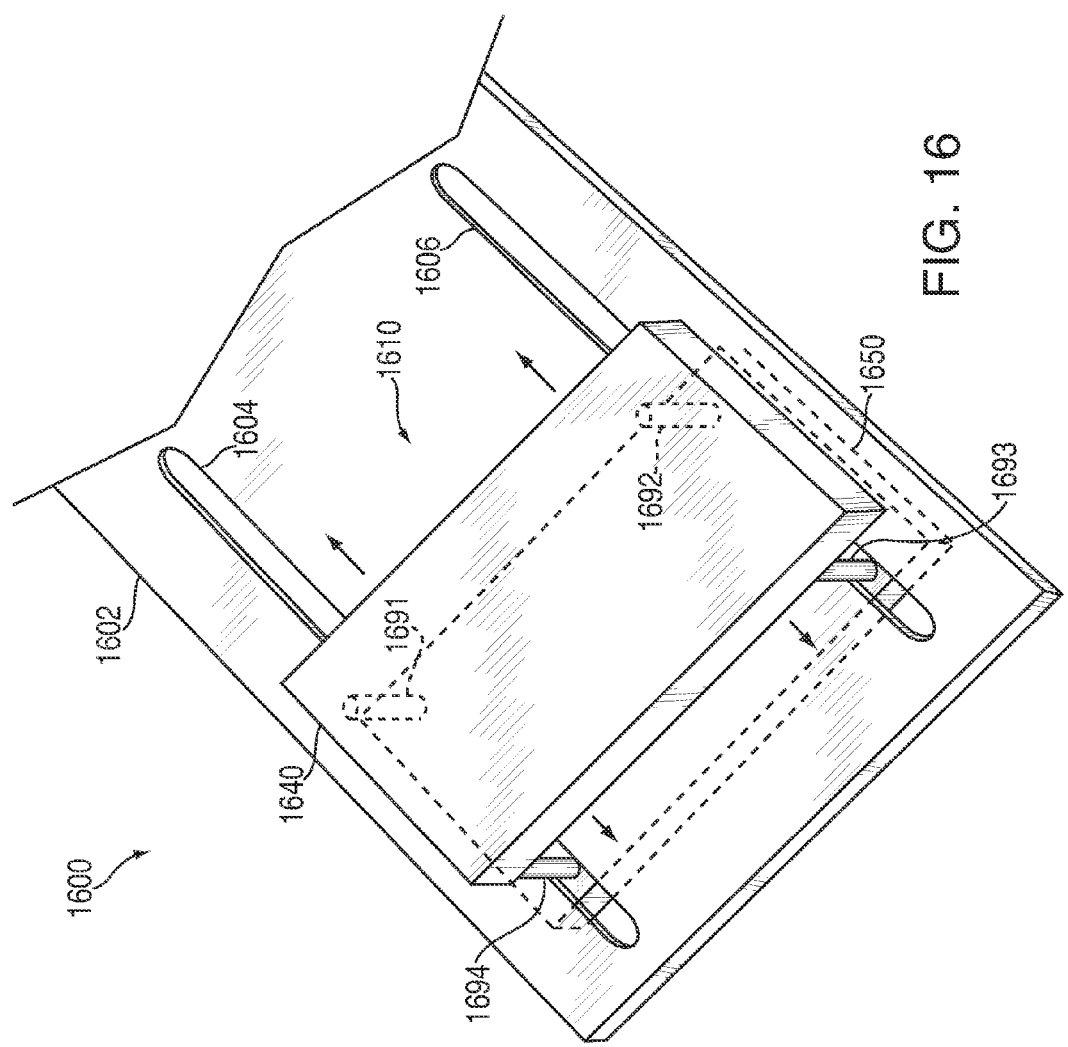
FIG. 16 is a perspective view of an illustrative electromagnetic induction system in accordance with one embodiment of the invention.

FIG. 16 includes electromagnetic induction system 1600 in accordance with one embodiment of the invention. System 1600 can include coil array 1610 that may include any number of coils printed on any number of circuit boards (see, e.g., coils 122 and 124 and circuit board 110 shown in FIG. 1). For example, coil array 1610 can include coils printed on different layers of a circuit board (see, e.g., FIGS. 3A and 3B), coils printed on different circuit boards in a stack (see, e.g., FIG. 4), coils printed on the same layer of a circuit board (see, e.g., FIG. 5), any other suitable configuration of coils, or any combination thereof.

System 1600 can include moveable magnet 1640 and moveable magnet 1650 that may each be adjacent to coil array 1610. Moveable magnet 1640 may be adjacent to a first side of coil array 1610, and moveable magnet 1650 may be adjacent to a second side of coil array 1610. Moveable magnets 1640 and 1650 may each include any material suitable for generating a magnetic field. For example, moveable magnets 1640 and 1650 may each be substantially similar to moveable magnets 1040 and 1050, and the previous description of the latter can be applied to the former.

In some embodiments, magnets on opposite sides of a printed coil array may be mechanically coupled together using one or more brackets. For example, one or more brackets may mechanically couple magnets together so that the magnets move alongside the printed coils in unison. Such a configuration may be advantageous because it may increase the strength of the magnetic field passing perpendicularly through the printed coils. In the embodiment shown in FIG. 16, magnet 1640 may be mechanically coupled with magnet 1650 using brackets 1691, 1692, 1693, and 1694. Brackets 1691-1694 may be posts that couple with each magnet near the corner of the magnet. In some embodiments, brackets for coupling magnets may be integrated into carriers or housings for the magnets or the brackets may be adhered to the surface of the magnet. In some embodiments, one or more brackets may couple together assemblies of multiple magnets on opposite sides of printed coils. For example, brackets similar to brackets 1691-1694 may be provided in conjunction with system 1300 (shown in FIG. 13) to couple magnets 1340 and 1341 together with magnets 1350 and 1350.

In some embodiments, a system may include a structure for supporting a coil array and guiding one or more magnets moveable adjacent to the array. For example, a circuit board that includes a coil array may include additional substrate along the periphery of the array for support. In another example, a circuit board that includes a coil array may be embedded in a support structure of a different material (e.g., a chassis). In the embodiment shown in FIG. 16, system 1600 may include structure 1602 for supporting coil array 1610 and guiding magnets 1640 and 1650. In some embodiments, structure 1602 may include an extension of the circuit board or stack of circuit boards that form coil array 1610. In some embodiments, structure 1602 may include a support structure composed of a material different from a circuit board or stack of circuit boards that form coil array 1610. For example, structure 1602 may include a chassis formed from a relatively rigid material.

In some embodiments, a system may include one or more slots in a support structure for guiding magnets moveable adjacent to printed coils. For example, a structure may include an extension of a circuit board or stack of circuit boards that form a coil array and the extension may include one or more slots for guiding adjacent magnets. In another example, a separate support structure in which a circuit board or stack of circuit boards may be mounted can include one or more slots for guiding magnets adjacent to the array. In some embodiments, the location and size of a slot may correspond to the location of one or more brackets used to couple magnets together. For example, a structure may include a slot overlapping the path of a bracket as magnets move alongside the printed coils. In the embodiment shown in FIG. 16, structure 1602 may include slot 1604 and slot 1606. The locations of slots 1604 and 1606 may correspond to the locations of brackets 1691-1694 when magnets 1640 and 1650 move alongside coil array 1610. For example, the location and size of slot 1604 may correspond to the path of brackets 1691 and 1694 as magnets 1640 and 1650 move adjacent to coil array 1610. In another example, the location and size of slot 1605 may corresponding to the path of brackets 1692 and 1693 as magnets 1640 and 1650 move adjacent to coil array 1610.

The brackets and corresponding slots shown in the embodiment of FIG. 16 are merely illustrative and other suitable brackets, corresponding slots, or other support structure can be used without deviating from the disclosure. For example, a bracket could be used that extends along one side of a magnet (e.g., a continuous bracket running between the locations of brackets 1692 and 1693). In another example, a support structure may be narrow enough that one or more brackets run alongside the outer edge (e.g., periphery) of the support structure.

An electromagnetic induction system with magnets on opposite side of printed coils may include one or more enclosures. In some embodiments, a system may include a first enclosure covering a first side of a printed coil array (see, e.g., enclosure 1342 shown in FIG. 13) and a second enclosure covering the second side of the printed coil array (see, e.g., enclosure 1352 shown in FIG. 13). For example, system 1600 may include a first enclosure (not shown) mounted to structure 1602 and covering the top side of coil array 1610 and magnet 1640. Continuing the example, system 1600 may include a second enclosure (not shown) mounted to structure 1602 and covering the bottom side of coil array 1610 and magnet 1650. In some embodiments, a system may include a single enclosure covering both sides of a printed coil array. Such an enclosure may completely envelop a coil array, moveable magnets, and any support structure. For example, system 1600 may include an enclosure (not shown) encapsulating structure 1602 so that both sides of coil array 1610 as well as magnets 1640 and 1650 are covered.

In some embodiments, a magnet may extend from one side of printed coils to an opposite side of printed coils. For example, a single magnet can be positioned adjacent to both the top side of printed coils and the bottom side of the printed coils. In some embodiments, a magnet may include a first portion adjacent to the top side of printed coils, a second portion adjacent to the bottom side of the printed coil, and a third portion extending from the first portion to the second portion. In some embodiments, the third portion of the magnet can extend through a structure for supporting a coil array (see, e.g., structure 1602 shown in FIG. 16). For example, a support structure may include one or more slots in a for guiding magnets moveable adjacent to printed coils and the third portion may extend through any of the one or more slots.

Figure 17:
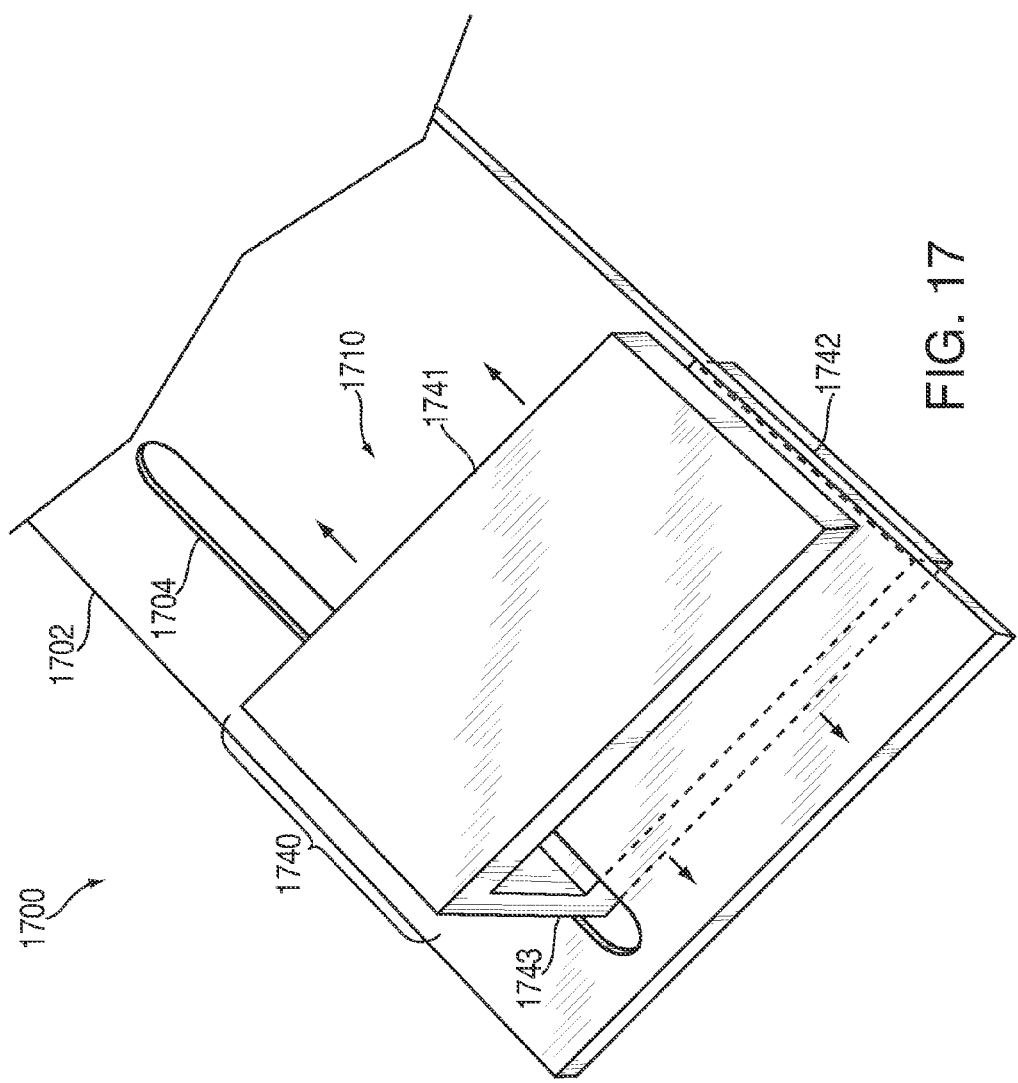
FIG. 17 is a perspective view of an illustrative electromagnetic induction system in accordance with one embodiment of the invention.

FIG. 17 includes electromagnetic induction system 1700 in accordance with one embodiment of the invention. System 1700 can include coil array 1710 that may include any number of coils printed on any number of circuit boards (see, e.g., coils 122 and 124 and circuit board 110 shown in FIG. 1). For example, coil array 1710 can include coils printed on different layers of a circuit board (see, e.g., FIGS. 3A and 3B), coils printed on different circuit boards in a stack (see, e.g., FIG. 4), coils printed on the same layer of a circuit board (see, e.g., FIG. 5), any other suitable configuration of coils, or any combination thereof.

System 1700 can include moveable magnet 1740 that may extend from one side of coil array 1710 to the opposite side of coil array 1710. For example, moveable magnet 1740 may be adjacent to both the top side of coil array 1710 and the bottom side of coil array 1710. Accordingly, moveable magnet 1740 may be operative to move alongside multiple sides of coil array 1710. Moveable magnet 1740 may include any material suitable for generating a magnetic field (see, e.g., magnet 140 shown in FIG. 1).

In some embodiments, a moveable magnet extending from one side of a coil array to an opposite side of the coil array may include multiple portions. For example, magnet 1740 may include first portion 1741 adjacent to the top side of coil array 1710, second portion 1742 adjacent to the bottom side of coil array 1710, and third portion 1743 extending from first portion 1741 to second portion 1742. Third portion 1743 may, for example, function as a mechanical link between first portion 1741 and second portion 1742. The length of third portion 1743 may be based at least partially on the thickness of coil array 1710. For example, the length of third portion 1743 may be selected so that both first portion 1741 and second portion 1742 are within close proximity of coil array 1710.

In some embodiments, a system may include a structure for supporting a coil array and guiding a magnet moveable adjacent to the array. For example, a circuit board that includes a coil array may include additional substrate along the periphery of the array for support. In another example, a circuit board that includes a coil array may be embedded in a support structure of a different material (e.g., a chassis). In the embodiment shown in FIG. 17, system 1700 may include structure 1702 for supporting coil array 1710 and guiding magnet 1740. In some embodiments, structure 1702 may include an extension of the circuit board or stack of circuit boards that form coil array 1710. In some embodiments, structure 1702 may include a support structure composed of a material different from a circuit board or stack of circuit boards that form coil array 1710. For example, structure 1702 may include a chassis formed from a relatively rigid material.

In some embodiments, a system may include one or more slots in a support structure for guiding a magnet moveable adjacent to printed coils. For example, a structure may include an extension of a circuit board or stack of circuit boards that form a coil array and the extension may include one or more slots for guiding adjacent magnets. In another example, a separate support structure in which a circuit board or stack of circuit boards may be mounted can include one or more slots for guiding magnets adjacent to the array. In some embodiments, the location and size of a slot may correspond to the shape and size of a magnet extending from a first side of the coil array to a second side of the coil array. For example, a structure may include a slot overlapping the path of a magnet portion that extends from a first side of the coil array to a second side (see, e.g., third portion 1743) as the magnet moves alongside the printed coils. In the embodiment shown in FIG. 17, structure 1702 may include slot 1704. The location of slot 1704 may correspond to the location of third portion 1743 of magnet 1740 when magnet 1740 moves alongside coil array 1710. For example, the location and size of slot 1704 may correspond to the path of third portion 1743 as magnet 1740 moves adjacent to coil array 1710.

The magnet shape and corresponding slot shown in the embodiment of FIG. 17 are merely illustrative and other suitable magnet shapes, corresponding slots, or other support structures can be used without deviating from the disclosure. For example, a magnet shape can include a curved portion extending through a slot (e.g., a curved third portion connecting a first portion adjacent to a first side of a coil array and a second portion adjacent to a second side of a coil array). In another example, a support structure may be narrow enough that a magnet can extend from one side of a coil array to another by wrapping around the outer edge (e.g., periphery) of the support structure.

In embodiments where a magnet can extend from one side of printed coils to an opposite side of printed coils, the connecting portion of the magnet extending between the two sides (see, e.g., third portion 1743 shown in FIG. 17) can serve multiple functions. In some embodiments, the connecting portion of the magnet can provide the functionality of a bracket that mechanically couples the first portion with the second portion (see, e.g., brackets 1691-1694 shown in FIG. 16). In some embodiments, the connecting portion of the magnet can alter the magnetic field of the magnet to intensify the portion of the magnetic field that passes through the printed coils. For example, the poles of the magnet can be located in portions of the magnet on opposite sides of printed coils and the connecting portion can serve as a return path for the magnetic field. Such a return path may intensify the portion of the magnetic field passing through the printed coils.

Figure 18:
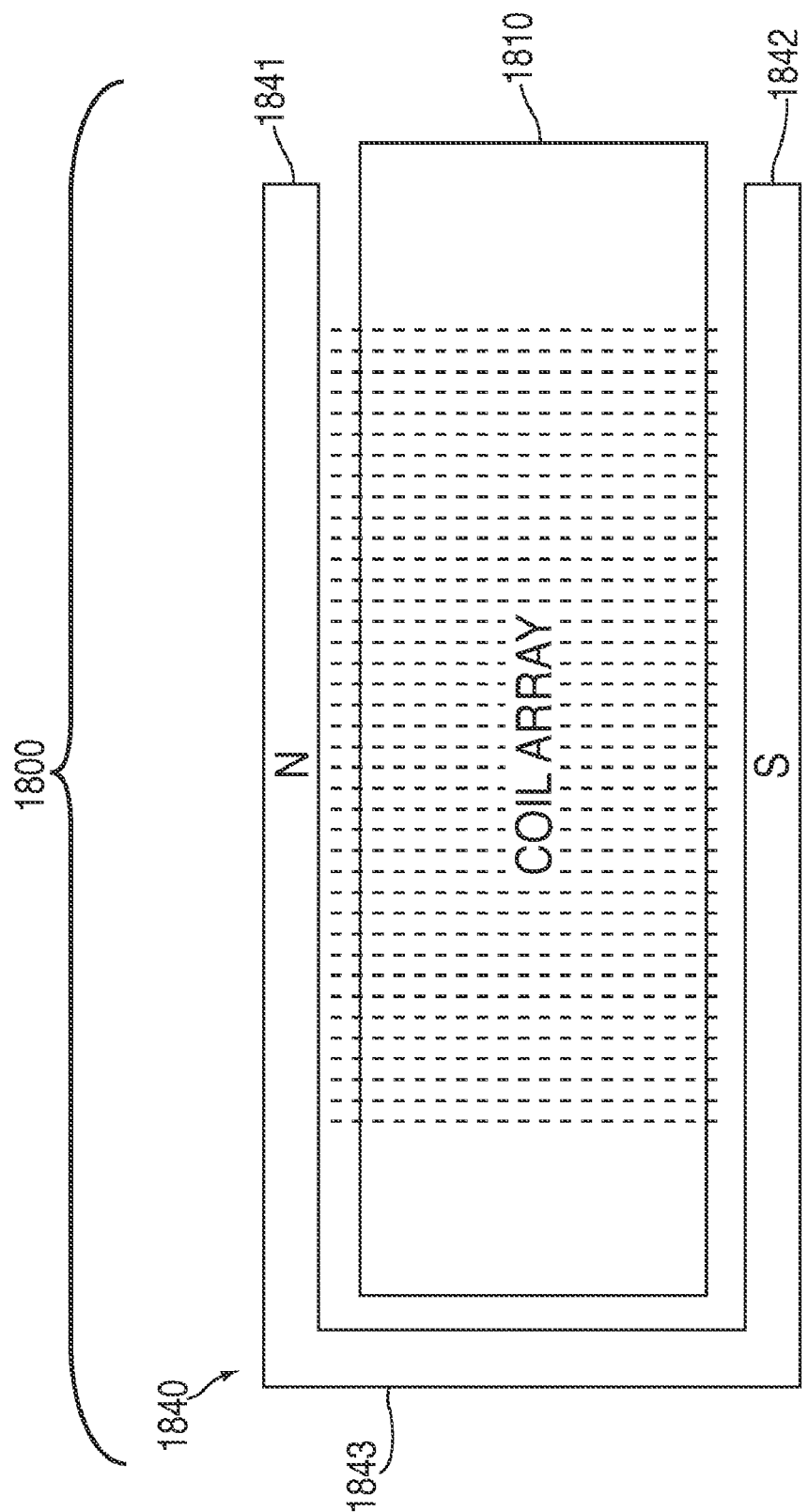
FIG. 18 is a cross-sectional view of an illustrative electromagnetic induction system in accordance with one embodiment of the invention.

FIG. 18 includes electromagnetic induction system 1800. System 1800 may include a coil array and a moveable magnet adjacent to opposite sides of the coils. For example, system 1800 may include coil array 1810 and moveable magnet 1840. Coil array 1810 may include any number of coils printed on any number of circuit boards (see, e.g., coils 152 and 154 and circuit board 110 shown in FIG. 1). Moveable magnet 1840 may include any object that produces a magnetic field (see, e.g., magnet 140 shown in FIG. 1). While no arrows are shown in FIG. 18, magnet 1840 may be moveable adjacent to coil array 1810 by moving perpendicular to the plane of FIG. 18 in a manner similar to the movement of magnet 1740 adjacent to coil array 1710 (shown in FIG. 17). Magnet 1840 may include multiple portions. For example, magnet 1840 may include first portion 1841 adjacent to the top side of coil array 1810 (see, e.g., first portion 1741 shown in FIG. 17). Continuing the example, magnet 1840 may include second portion 1842 adjacent to the bottom side of coil array 1810 (see, e.g., second portion 1742 shown in FIG. 17). Extending between the first and second portions, magnet 1840 may include third portion 1843 (see, e.g., third portion 1743 shown in FIG. 17).

In some embodiments, the poles of a magnet extending from one side of printed coils to an opposite side of printed coils may be positioned to maximize the magnetic field perpendicular to the coils. For example, the poles of magnet 1840 may be positioned so that a first pole is adjacent to one side of coil array 1810 and a second pole is adjacent to the opposite side of coil array 1810. In the embodiment shown in FIG. 18, the north pole is positioned in first portion 1841 adjacent to the top side of coil array 1810 and the south pole is positioned in second portion 1842 adjacent to the bottom side of coil array 1810. FIG. 18 displays magnetic field lines for magnet 1840.

As shown in FIG. 18, a substantially large portion of the magnetic field of magnet 1840 may pass perpendicularly through coil array 1810 while extending from first portion 1841 to second portion 1842. Moreover, a minimal amount of the magnetic field may extend back to the surfaces of magnet 1840 facing away from the coil array (see, e.g., magnetic fields shown in FIGS. 11 and 14). Accordingly, it may be advantageous to provide a magnet extending from one side of printed coils to an opposite side of the printed coils the resulting magnetic field may be focused on the printed coils.

Any suitable methods can be used to manufacture electromagnetic induction systems in accordance with the disclosure. For example, one or more known circuit board manufacturing methods can be used to generate a printed coil array and then the remaining components of a system may be provided. For example, one or more moveable magnets may be provided adjacent to the coil array and then one or more enclosures can be coupled to the coil array or a support structure for covering the magnets.

Figure 19:
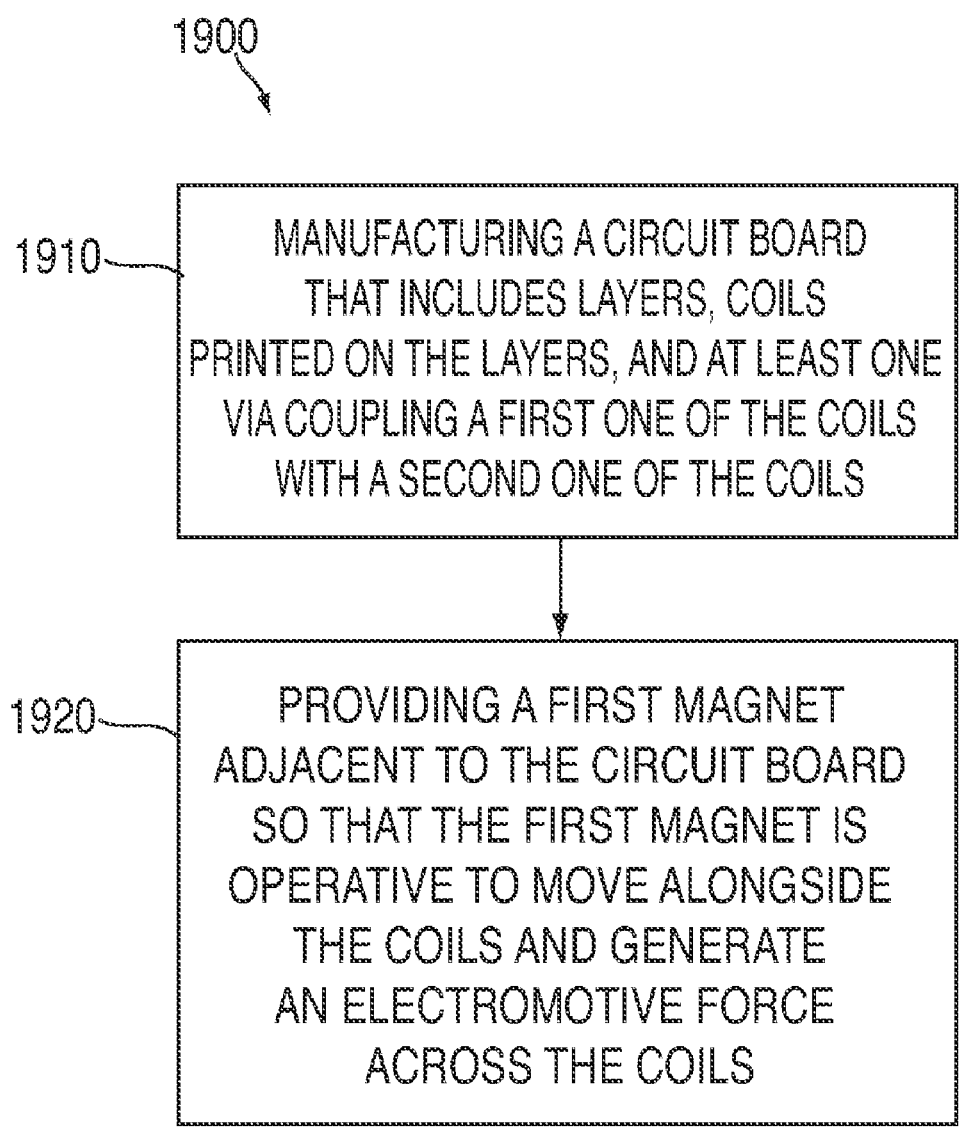
FIG. 19 is a flowchart of an illustrative process for manufacturing an electromagnetic induction system in accordance with one embodiment of the invention.

FIG. 19 includes process 1900 for manufacturing an electromagnetic induction system in accordance with one embodiment. Process 1900 can be used to form an electromagnetic induction system that includes printed coils. At block 1910, a circuit board can be manufactured that includes layers, coils printed on the layers, and at least on via coupling a first one of the coils with a second one of the coils. For example, a circuit board similar to circuit board 310 (shown in FIGS. 3A and 3B) or circuit board 510 (shown in FIG. 5) can be manufactured. In some embodiments, a multi-layered circuit board with printed coils can be manufactured using any suitable technique. For example, each coil can be formed on each layer using an etching process, vias can be drilled in one or more layers, and then the layers can be combined to form a circuit board. The circuit board manufactured at block 1910 can include any suitable number of layers, coils, and vias.

At block 1920, a first magnet can be provided adjacent to the circuit board so that the first magnet is operative to move alongside the coils and generate an electromotive force across the coils. For example, a magnet can be provided on one side of a circuit board, and the magnet can be moveable alongside the coils (see, e.g., magnet 740 shown in FIG. 7).

In some embodiments, process 1900 can include attaching an enclosure to the circuit board. Such an enclosure may be operative to retain the first magnet in close proximity to the circuit board while it moves alongside the coils (see, e.g., enclosure 742 shown in FIG. 7).

In some embodiments, process 1900 can include providing multiple magnets adjacent to the circuit board. For example, one magnet may be provided adjacent to the top surface of the circuit board and another magnet may be provided adjacent to the bottom surface of the circuit board (see, e.g., system 1000 shown in FIG. 10). In some embodiments, process 1900 can include coupling a first magnet adjacent to a top side of a circuit board with a second magnet adjacent to a bottom side of a circuit board (see, e.g., system 1600 shown in FIG. 16).

In some embodiments, process 1900 can include applying ferrofluid to a magnet. Such ferrofluid may serve as a lubricant to reduce friction as the magnet moves alongside the printed coils (see, e.g., ferrofluid 745 shown in FIG. 7).

In some embodiments, process 1900 can include machining a slot in the circuit board. For example, a slot can be machined in the circuit board to guide the a magnet when it moves alongside the coils. Such a slot can be similar to slot 1604 (shown in FIG. 16) or slot 1704 (shown in FIG. 17).

In some embodiments, process 1900 can include attaching the circuit board to a support structure. Such a support structure may be formed from a rigid or durable material. In some embodiments, such a support structure may include a slot operative to guide the a magnet when it moves alongside the coils. Such a slot can be similar to slot 1604 (shown in FIG. 16) or slot 1704 (shown in FIG. 17).

The previously described embodiments are presented for purposes of illustration and not of limitation. It is understood that one or more features of an embodiment can be combined with one or more features of another embodiment to provide systems and/or methods without deviating from the spirit and scope of the invention. The present invention is limited only by the claims which follow.

What is claimed is:

1. An electromagnetic induction system comprising:
   a circuit board comprising:
      a first layer; and
      a first plurality of printed coils on the first layer; and
   at least one magnet adjacent to the circuit board and configured to move relative to the circuit board to generate electrical power via electromagnetic induction.

2. The system of claim 1, the circuit board further comprising:
   a second layer adjacent to the first layer; and
   a second plurality of printed coils on the second layer; and
   vias between the first layer and the second layer, wherein one of the vias electrically couples one of the first plurality of printed coils with a respective one of the second plurality of printed coils.

3. The system of claim 2, wherein each of the vias electrically couples a printed coil of the first plurality of printed coils with a respective printed coil of the second plurality of printed coils.

4. The system of claim 1, wherein one of the first plurality of printed coils comprises an endpoint trace configured to provide a conductive path for electrically coupling with external circuitry.

5. The system of claim 1, wherein the printed coils of the first plurality of printed coils are electrically coupled in series.

6. The system of claim 1, wherein the printed coils of the first plurality of printed coils are electrically coupled in parallel.

7. The system of claim 1, wherein the first plurality of printed coils comprises multiple printed coils adjacent to one another.

8. A system comprising:
   a circuit board comprising:
      a first layer;
      at least one printed coil printed on the first layer; and
      a protective layer adjacent to and covering at least a portion of the first layer; and
   a magnet adjacent to the protective layer of the circuit board and configured to generate an electromotive force across the at least one printed coil.

9. The system of claim 8, wherein the protective layer comprises a dielectric material.

10. The system of claim 8, wherein the protective layer comprises a low-friction material.

11. The system of claim 8, further comprising:
    an enclosure adjacent to the circuit board for guiding the magnet.

12. The system of claim 11, wherein the enclosure creates a sealed environment for the magnet.

13. The system of claim 12, wherein the enclosure is filled with a lubricant to reduce friction created by the magnet.

14. The system of claim 11, wherein the enclosure comprises a ferrite sheet opposite the circuit board to block a portion of a magnetic field from the magnet that extends away from the at least one printed coil.

15. A method for manufacturing an electromagnetic induction system, the method comprising:
    manufacturing a circuit board comprising:
       at least one layer; and
       a plurality of coils printed on the at least one layer; and
    providing a first magnet adjacent to the circuit board, wherein the first magnet is configured to move alongside the plurality of coils and generate an electromotive force across the plurality of coils.

16. The method of claim 15, further comprising:
attaching an enclosure to the circuit board, the enclosure being configured to retain the first magnet in close proximity to the circuit board while allowing the first magnet to move alongside the plurality of coils.

17. The method of claim 15, wherein:
the circuit board comprises a top side and a bottom side;
providing the first magnet comprises providing the first magnet adjacent to the top side of the circuit board; and
the method further comprises providing a second magnet adjacent to the bottom side of the circuit board, wherein the second magnet is operative to move alongside the plurality of coils and generate an electromotive force across the plurality of coils.

18. The method of claim 16, further comprising:
coupling the first magnet with the second magnet.

19. The method of claim 15, further comprising:
applying ferrofluid to the first magnet, wherein the ferrofluid is configured to lubricate the first magnet for movement alongside the plurality of coils.

20. The method of claim 15, further comprising:
machining a slot in the circuit board, wherein the slot is configured to guide the first magnet when it moves alongside the plurality of coils.

21. The method of claim 15, further comprising:
attaching the circuit board to a support structure with a slot operative to guide the first magnet when it moves alongside the plurality of coils.

* * * * *